United States Patent
Benzing, II et al.

(10) Patent No.: US 9,016,336 B2
(45) Date of Patent: *Apr. 28, 2015

(54) SYSTEM FOR NON-PNEUMATIC SUPPORT OF A VEHICLE

(71) Applicant: The Goodyear Tire & Rubber Company, Akron, OH (US)

(72) Inventors: James Alfred Benzing, II, North Canton, OH (US); Wesley Glen Sigler, Barberton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,517

(22) Filed: Apr. 24, 2014

(65) Prior Publication Data

US 2014/0230977 A1    Aug. 21, 2014

Related U.S. Application Data

(63) Continuation of application No. 13/162,695, filed on Jun. 17, 2011, now Pat. No. 8,720,504.

(51) Int. Cl.
| | |
|---|---|
| *B60C 7/14* | (2006.01) |
| *B29D 30/06* | (2006.01) |
| *B60C 11/03* | (2006.01) |
| *B29D 30/00* | (2006.01) |
| *B60C 7/26* | (2006.01) |
| *B29D 30/02* | (2006.01) |

(52) U.S. Cl.
CPC ........... *B60C 7/14* (2013.01); *Y10T 152/10036* (2015.01); *Y10T 152/10045* (2015.01); *B60C 11/0311* (2013.04); *B60C 7/143* (2013.04); *B29D 30/00* (2013.01); *B29D 30/0678* (2013.01); *B60C 7/26* (2013.01); *B29D 30/0606* (2013.01); *B29D 30/02* (2013.01)

(58) Field of Classification Search
CPC .... B60C 11/0306; B60C 11/04; B60C 17/06; B60C 7/125; B60C 7/16; B60C 9/2006; B60C 9/16
USPC ......... 152/155, 250, 246, 397, 539, 548, 550, 152/516–517
See application file for complete search history.

(56) References Cited

U.S. PATENT DOCUMENTS

| | | | |
|---|---|---|---|
| 1,415,281 A | 5/1922 | Harris et al. | |
| 3,789,899 A * | 2/1974 | Kobayashi | 152/510 |
| 5,372,172 A * | 12/1994 | Iseki | 152/548 |
| 5,587,030 A * | 12/1996 | Herbelleau | 152/555 |
| 6,692,047 B1 * | 2/2004 | Solon | 293/128 |
| 2006/0249236 A1 | 11/2006 | Moon et al. | |

OTHER PUBLICATIONS

Chinese Search Report.

* cited by examiner

*Primary Examiner* — Glenn Dayoan
*Assistant Examiner* — Sunsurraye Westbrook
(74) *Attorney, Agent, or Firm* — Robert N. Lipcsik

(57) ABSTRACT

A non-pneumatic tire includes a plurality of springs. Each spring includes a first end portion, a second end portion, and an arching middle portion. Each spring is interwoven with at least one other spring thereby forming a toroidal structure extending about an entire circumference of the non-pneumatic tire. The toroidal structure is at least partially coated with an elastomer. One end portion of at least one spring is wrapped around a first bead structure adjacent a rim.

20 Claims, 20 Drawing Sheets

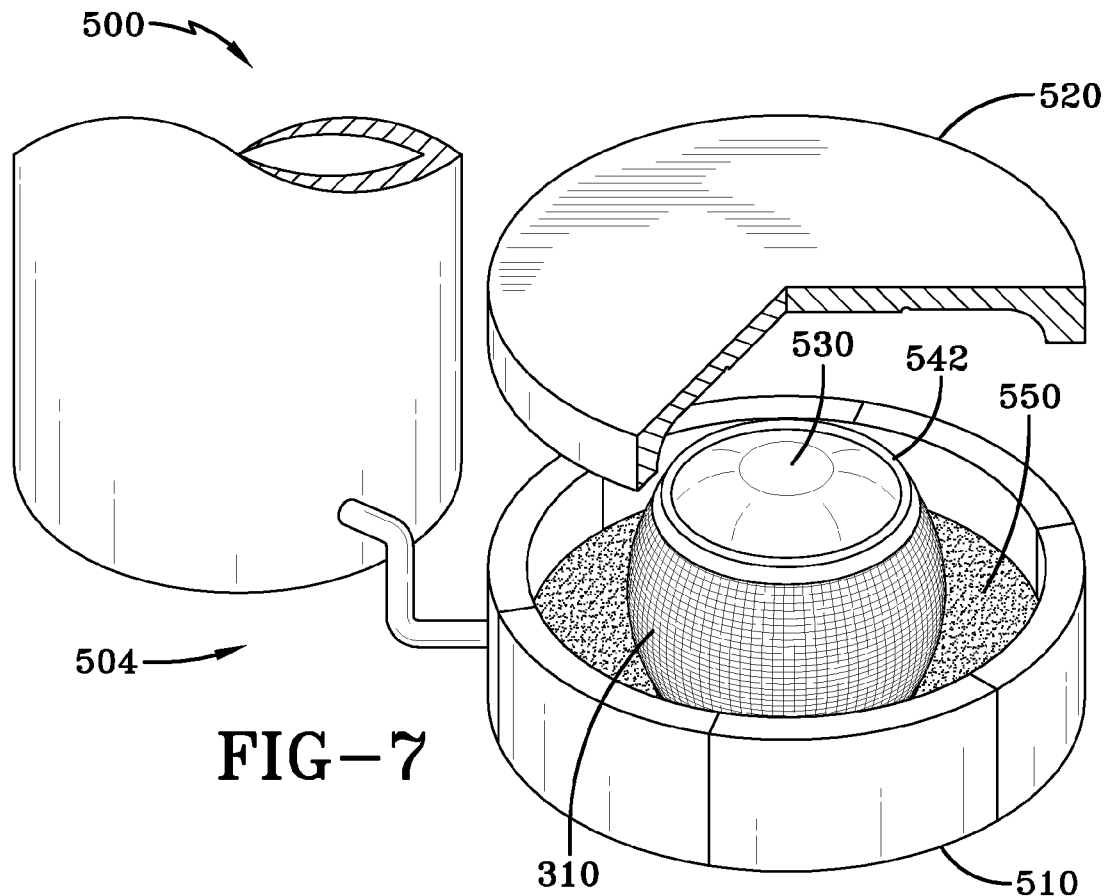
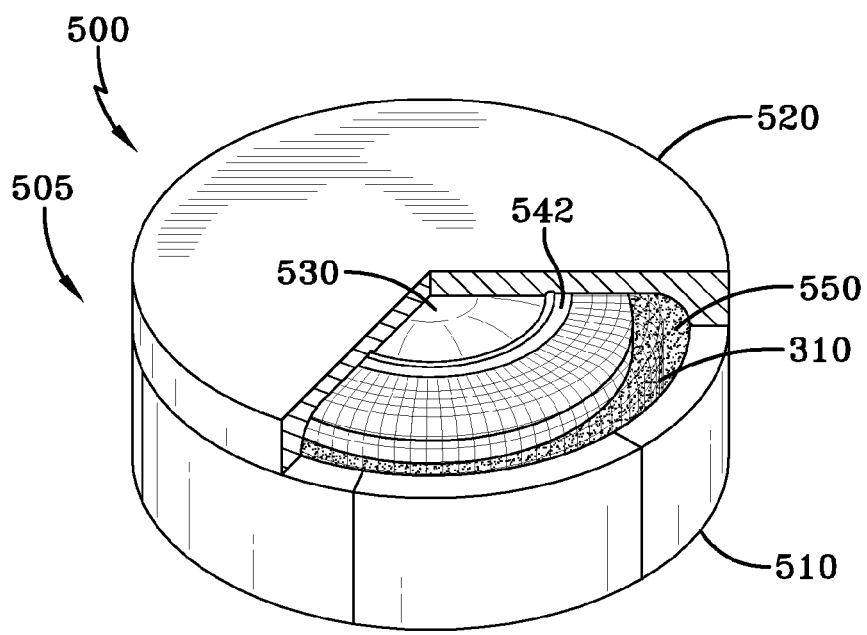

SYSTEM FOR NON-PNEUMATIC SUPPORT OF A VEHICLE

FIELD OF THE INVENTION

This invention relates to a system for non-pneumatic support of a vehicle and, more specifically, to a non-pneumatic tire and a method of constructing such a non-pneumatic tire.

BACKGROUND OF THE INVENTION

Conventional non-pneumatic solid rubber tires have been used prior to pneumatic tires. As vehicle speeds increased and ride characteristics became more important, the need for a pneumatic structure emerged. The pneumatic tire provided a solution to the problems and limitations of solid, non-pneumatic tires.

The conventional pneumatic tire is an efficient structure that has endured as a solution to conventional vehicle requirements. The conventional pneumatic tire is a "tensile structure." Tensile structures contain a compression structure for providing a tensile preload in the tensile structure. The tensile structure may typically accept no compression, and the compression structure, no tension. In pneumatic tires, cords are the tensile structure and compressed air is the compression structure.

A drawback of a conventional pneumatic tire is that it is pneumatic. Air contained under pressure may, and typically does, escape at inopportune times, at least from a vehicle operator's view point.

A non-pneumatic tire has no air under pressure. It is a tire structure that performs similarly to a pneumatic tire, without requiring air contained under pressure. Communication of a non-pneumatic tire with a road/contact surface in the area of the tire footprint, or contact patch, provides the only force input to the vehicle from the contact surface and provides the handling forces and load to the contact surface. Thus, a non-pneumatic tire has these fundamental characteristics in common with a pneumatic tire.

A conventional pneumatic tire has unique flexure and load carrying characteristics. Shock and deflections, although occurring locally in the area radially inwardly of the footprint, may be absorbed globally by the entire tire structure. Cornering characteristics are achieved by a combination of increases and decreases in tension of the tire sidewall.

A conventional non-pneumatic tire must similarly be able to withstand shock loads and dissipate absorbed energy. However, unlike a pneumatic tire, a non-pneumatic tire typically absorbs shocks and deflects locally within the footprint or contact patch. Such localized deflection of a non-pneumatic tire must therefore also exhibit high dampening characteristics.

Further, any tire in a running condition must be able to dissipate heat. The nature of dampening loads is a form of energy dissipation. Energy absorbed is converted to heat. Heat, in turn, may affect tire performance and may result in premature tire failure. Thus, efficient dissipation of heat is essential for any tire. Ideally, energy is only absorbed by the tire in the area radially inward of the footprint or contact patch so that energy may be removed from such area during the remainder of the tire's revolution.

However, rubber is a poor conductor of heat. The thicker the rubber, the greater the heat accumulation. The heat accumulation may be mitigated to a controlled level by having thin material cross sections with high air circulation.

Urethane tires can operate at temperatures as high as about 93° C. (200° F.). Temperatures higher than 121° C. (250° F.) degrees for prolonged periods will cause a weakening of the urethane. If the temperature of a urethane tire rises high enough, premature failure of the urethane tire may occur.

One conventional non-pneumatic tire/wheel includes a central portion of resilient material, an outer resilient tread portion, and an interposed shock absorbing portion comprising a plurality of crossed webs of resilient material formed with the center and tread portions. Formed in the inner portion of the shock absorbing portion is an annular series of orifices. The orifices are set transversely and slightly overlapping. Each orifice extends across the entire axial width of the shock absorbing portion. A pair of disks is also provided with similar orifices. One disk is positioned on each side of the tire/wheel with orifices aligned with those of the shock absorbing portion. Upon molding, one integral unit is formed. This cushion tire/wheel eliminated the metal parts used to fasten a pneumatic or solid rubber tire to a wheel.

Such conventional attempts to develop a non-pneumatic tire failed to provide adequate heat dissipation along with adequate load bearing capability. As vehicle speeds have increased, these concepts have been incapable of meeting the needs of the passenger and truck tires.

Another conventional non-pneumatic tire is integrally molded from an elastomeric material to form a unitary structure comprising inner and outer "hoops." The outer hoop is supported and cushioned by a plurality of circumferentially spaced apart planar ribs and a planar central web, which connects the hoops at their circumferential center. The web lies in a plane perpendicular to the rotational axis of the tire. The ribs extend axially along the inner and outer hoops connecting the hoops with edges of the ribs along opposite faces of the web. The planar ribs may be undercut at the radial extremes to assure bending and no buckling unless a critical load is exceeded.

Another conventional non-pneumatic tire has an equatorial plane, an axis perpendicular to the equatorial plane, an annular tread rotatable about the axis, and an annular elastomer body made from a material having a Shore A hardness in the range of 60 to 100. The elastomer body has first and second spaced lateral sides. The sides are spaced equidistant from the equatorial plane and extend between the tread and the rim. The body has openings positioned equidistant from the axis, some of which extend from the first side and others which extend from the second side to form first and second sets of openings. The sets of openings extend from respective sides toward the equatorial plane. The openings form equally spaced columns of elastomer material in the body. The columns formed by the first set of openings are inclined to the radial direction of the tire, and the columns formed by the second set of openings are generally inclined to the radial direction of the tire, but are opposite in inclination with respect to the columns formed by the first set of openings.

The National Aeronautics and Space Administration (NASA) has developed surface vehicles to support long range lunar exploration and the development of a lunar outpost. These vehicles are heavier and travel greater distances than the Lunar Roving Vehicle (LRV) developed for the Apollo program in the late 1960s. Consequently, new tires will be required to support up to ten times the weight, and last for up to one hundred times the travel distance, as compared to those used on the Apollo LRV, thereby requiring operational characteristics similar to passenger vehicles used on earth. However, conventional rubber pneumatic tires cannot function acceptably in space.

For example, rubber properties vary significantly between the cold temperatures experienced in shadow (down to 40 K) and the hot temperatures in sunlight (up to 400 K). Further, rubber degrades when exposed to direct solar radiation, without atmospheric protection. Finally, an air-filled tire is not permissible for manned lunar vehicles because of the possibility of a flat tire. To overcome these limitations, a tire design has been developed for the Apollo LRV and was successfully used on Apollo missions 15, 16. and 17. This non-pneumatic tire was woven from music wire, which was robust to lunar temperature variations and solar radiation, operated in vacuum, and did not require air for load support. This structure further functioned to contour to the lunar terrain, which facilitated traction and reduced vibration transfer to the Apollo LRV.

As stated above, because of the new weight and distance requirements for lunar vehicles, a tire with greater strength and durability was required. One conventional wheel and non-pneumatic tire assembly has a variable diameter which, in addition to changing its diameter, may also change its width, thereby increasing the area of the wheel that engages the ground. Thus, this non-pneumatic tire may be adjusted to increase a vehicle's performance according to the terrain over which it is traveling. This tire/wheel has arching members with first and second ends connecting a wheel hub. The arching members extend outwardly in an arc between the first and second ends. The arching members form a plurality of flexible hoops spaced circumferentially around the hub and extending radially outward from the hub.

More specifically, this conventional non-pneumatic tire/wheel forms a cage composed of thirty-eight equally spaced radially extending hoops that arch between axially outer rims of a hub. The hoops are made of helical steel springs filled by wires cut to a desired length and threaded through the center of the springs. The conventional hub may be expanded/contracted axially for varying the diameter of the tire/wheel.

The wire mesh design of the Apollo LRV tire was found to not be readily scalable. Specifically, the increase in wire diameter to create a tire that supported ten times the load of the original design created two significant limitations: 1) the ability to contour to the terrain was lost, thus limiting traction and ability to isolate vibration; and 2) the increased wire stresses limited functional life.

Thus, another conventional non-pneumatic tire/wheel includes a plurality of helical springs. Each helical spring includes a first end portion, a second end portion, and an arching middle portion interconnecting the first end portion and the second end portion. Each helical spring is interwoven, or interlaced, with at least one other helical spring of the plurality thereby forming a woven toroidal structure extending about an entire circumference of the non-pneumatic tire/wheel. A subset of helical springs may be secured to a first annular rim of a wheel and/or a second annular rim of the wheel. A wheel with an annular rim at each axial side of the tire may secure the tire to the wheel. Thus, as compared to structures of conventional pneumatic tires, the woven/laced toroidal structure of interwoven helical springs defines a first ply for the non-pneumatic tire. A second ply may radially overlap the first ply. Such a second ply may comprise the same interwoven toroidal structure as the first ply.

As a result, an improved non-pneumatic tire for use in specific applications is desirable.

DEFINITIONS

"Apex" means an elastomeric filler located radially above the bead core and between the plies and the turnup ply.

"Annular" means formed like a ring.

"Aspect ratio" means the ratio of its section height to its section width.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25°-65° angle with respect to equatorial plane of the tire. If multiple plies are present, the ply cords run at opposite angles in alternating layers.

"Breakers" means at least two annular layers or plies of parallel reinforcement cords having the same angle with reference to the equatorial plane of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread, i.e., the whole tire.\

"Chipper" refers to a narrow band of fabric or steel cords located in the bead area whose function is to reinforce the bead area and stabilize the radially inwardmost part of the sidewall.

"Circumferential" means lines or directions extending along the perimeter of the surface of the annular tire parallel to the Equatorial Plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane. The "cord angle" is measured in a cured but uninflated tire.

"Denier" means the weight in grams per 9000 meters (unit for expressing linear density). Dtex means the weight in grams per 10,000 meters.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Footprint" means the contact patch or area of contact of the tire tread with a flat surface at zero speed and under normal load.

"Gauge" refers generally to a measurement, and specifically to a thickness measurement.

"Harshness" means the amount of disturbance transmitted by a tire when it passes over minor, but continuous, road irregularities.

"High Tensile Steel (HT)" means a carbon steel with a tensile strength of at least 3400 MPa @ 0.20 mm filament diameter.

"Hysteresis" means a retardation of the effect when forces acting upon a body are changed.

"Inner" means toward the inside of the tire and "outer" means toward its exterior.

"Innerliner" means the layer or layers of elastomer or other material that form the inside surface of a tubeless tire and that contain the inflating fluid within the tire.

"LASE" is load at specified elongation.

"Lateral" means an axial direction.

"Lay length" means the distance at which a twisted filament or strand travels to make a 360 degree rotation about another filament or strand.

"Mega Tensile Steel (MT)" means a carbon steel with a tensile strength of at least 4500 MPa @ 0.20 mm filament diameter.

"Normal Load" means the specific design inflation pressure and load assigned by the appropriate standards organization for the service condition for the tire.

"Normal Tensile Steel (NT)" means a carbon steel with a tensile strength of at least 2800 MPa @ 0.20 mm filament diameter.

"Ply" means a cord-reinforced layer of rubber-coated radially deployed or otherwise parallel cords.

"Pneumatic tire" means a laminated mechanical device of generally toroidal shape (usually an open-torus) having beads and a tread and made of rubber, chemicals, fabric, steel, and/or other materials. When mounted on the wheel of a vehicle, the pneumatic tire, through its tread, provides traction and contains a fluid that sustains the vehicle load.

"Radial" and "radially" are used to mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Rim" means a support for a tire or a tire and tube assembly upon which the tire is secured.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that portion of a tire between the tread and the bead.

"Spring rate" means the stiffness of a tire or spring expressed as the slope of a load deflection curve.

"Super Tensile Steel (ST)" means a carbon steel with a tensile strength of at least 3650 MPa @ 0.20 mm filament diameter.

"Tenacity" is stress expressed as force per unit linear density of the unstrained specimen (gm/tex or gm/denier). Used in textiles.

"Tensile" is stress expressed in forces/cross-sectional area. Strength in psi=12,800 times specific gravity times tenacity in grams per denier.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread width" means the arc length of the tread surface in a plane including the axis of rotation of the tire.

"Turnup end" means the portion of a carcass ply that turns upward (i.e., radially outward) from the beads about which the ply is wrapped.

"Ultra Tensile Steel (UT)" means a carbon steel with a tensile strength of at least 4000 MPa @ 0.20 mm filament diameter.

"Yarn" is a generic term for a continuous strand of textile fibers or filaments. Yarn occurs in the following forms: 1) a number of fibers twisted together; 2) a number of filaments laid together without twist; 3) a number of filaments laid together with a degree of twist; 4) a single filament with or without twist (monofilament); 5) a narrow strip of material with or without twist.

SUMMARY OF INVENTION

A non-pneumatic tire in accordance with the present invention includes a plurality of springs. Each spring includes a first end portion, a second end portion, and an arching middle portion. Each spring is interwoven with at least one other spring thereby forming a toroidal structure extending about an entire circumference of the non-pneumatic tire. The toroidal structure is at least partially coated with an elastomer. One end portion of at least one spring is wrapped around a first bead structure adjacent a rim.

According to another aspect of the present invention, one end portion of each spring is wrapped around the first bead structure or a second bead structure and the other end of each spring is not wrapped around either bead structure.

According to still another aspect of the present invention, both end portions of each interwoven spring are wrapped around the first bead structure and a second bead structure.

According to yet another aspect of the present invention, the end portion of at least one spring wrapped around the first bead structure is encased by the elastomer.

According to still another aspect of the present invention, each end portion of each spring is encased by the elastomer.

According to yet another aspect of the present invention, the other end portion of the at least one spring is not wrapped around a second bead structure.

According to still another aspect of the present invention, the other end portion is disposed adjacent the second bead structure.

According to yet another aspect of the present invention, the other end portion is secured by the elastomer.

According to still another aspect of the present invention, the rim is a standard rim.

According to yet another aspect of the present invention, both end portions of each spring are secured to the first bead structure and a second bead structure.

A system in accordance with the present invention constructs a non-pneumatic tire. The non-pneumatic tire includes a plurality of springs. Each spring includes a first end portion secured to a first bead portion, a second end portion secured to a second bead portion, and an arching middle portion. Each spring is interwoven with at least one other spring thereby forming a toroidal carcass ply structure extending about an entire circumference of the non-pneumatic tire. The toroidal carcass ply structure is at least partially coated with an elastomer cured to adhere to the toroidal carcass ply structure.

According to another aspect of the present invention, the elastomer includes a two-part polyurethane for chemically curing the elastomer onto the toroidal carcass ply structure at ambient temperature.

According to still another aspect of the present invention, the cured elastomer forms a tread portion for generating traction of the non-pneumatic tire over varied contact surfaces.

According to yet another aspect of the present invention, the toroidal carcass ply structure forms an anisotropic structure having different mechanical properties in the circumferential direction of the non-pneumatic tire and the radial direction of the non-pneumatic tire.

According to still another aspect of the present invention, the system further includes a segmented mold for curing the elastomer to the toroidal carcass ply structure.

According to yet another aspect of the present invention, each spring is interwoven with an adjacent spring on a first side of the spring and further is interwoven with an adjacent spring on a second opposite side of the spring thereby forming a toroidal carcass ply structure extending about an entire circumference of the non-pneumatic tire.

According to still another aspect of the present invention, the elastomer is urethane.

BRIEF DESCRIPTION OF THE DRAWINGS

The structure, operation, and advantages of the present invention will become more apparent upon contemplation of the following description as viewed in conjunction with the accompanying drawings, wherein:

FIG. 7 schematically shows a fifth step of constructing a non-pneumatic tire in accordance with the system of the present invention.

FIG. 8 schematically shows a sixth step of constructing a non-pneumatic tire in accordance with the system of the present invention.

Figure 1:
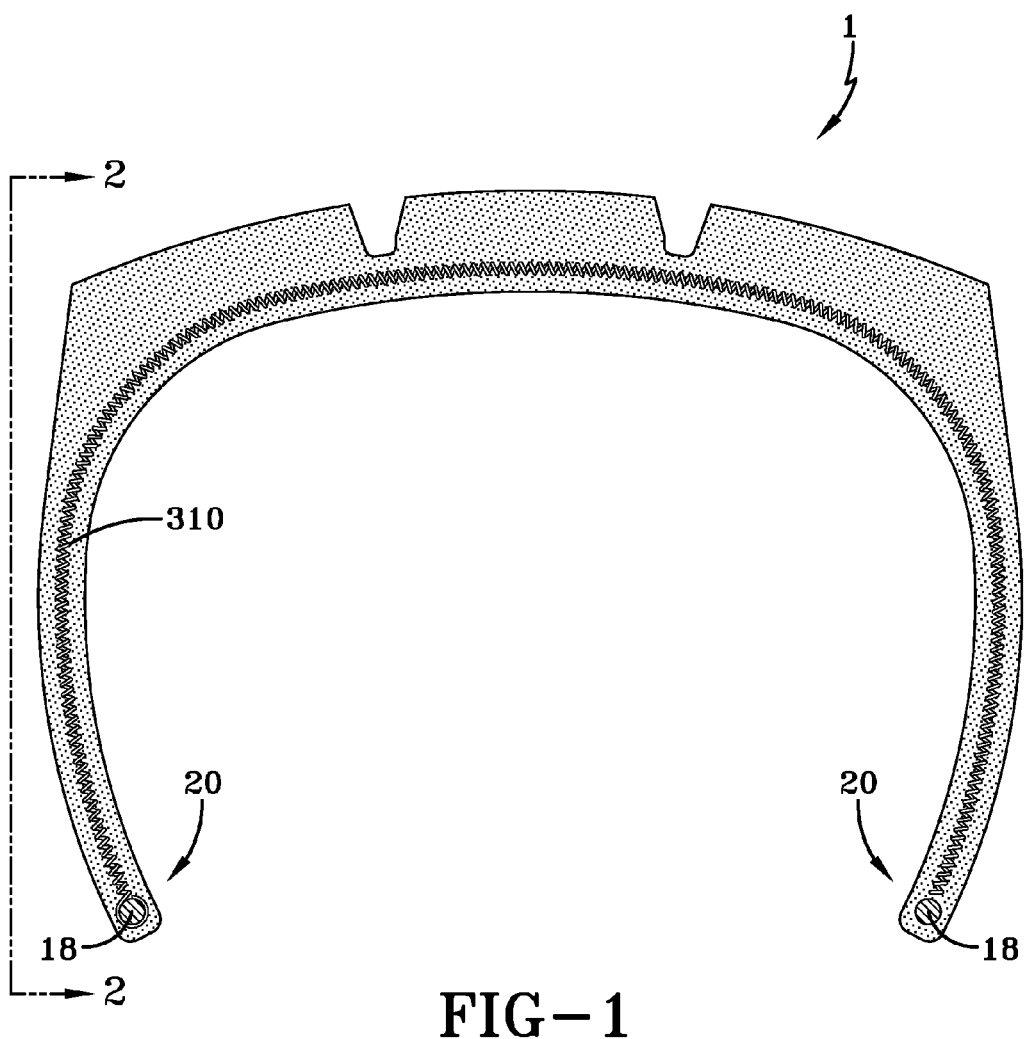
FIG. 1 represents a schematic cross-sectional view of an example tire in accordance with the present invention.

DETAILED DESCRIPTION OF EXAMPLE EMBODIMENTS OF THE SYSTEM OF THE PRESENT INVENTION

A system for use with the present invention may comprise a method 500 of constructing a tire for non-pneumatic support of a vehicle, a non-pneumatic tire 100 for supporting a vehicle, or both.

The method 500 may include providing a segmented cylindrical open-ended mold 510, a circular mold cap 520 corresponding to the mold, and an inflatable/expandable bladder 530. In a first construction step 510, an open ended cylindrical carcass ply, for example the carcass ply defined by the springs 310 below, may be slid over, or lowered around, the bladder 530. In a second step 502, a first circular bead 541 is seated in a corresponding first circular groove (not shown) in the mold 510. In a third step 503, the bladder 530 is partially inflated to form a bulged ply. In a fourth step 504, an elastomer 550, such as polyurethane, is poured into the mold 510. In a fifth step 505, the mold cap 520 is lowered into closing engagement with the mold 510 thereby seating a second circular bead 542 in a corresponding second circular groove (not shown) in the mold cap and also axially compressing the beads 541, 542 of the carcass ply creating a toroidal carcass structure. In a sixth step 506, the bladder 530 is further inflated, thereby expanding the carcass ply further and facilitating flow of the elastomer 550 around the exposed surfaces of the carcass ply. Air and excess elastomer 550 may be expelled from the interior of the mold/mold cap 510, 520 through a one-way check valve (not shown) in the mold/mold cap during this sixth step 506.

In a seventh step 507, the bladder 530 is fully inflated, thereby fully expelling air and excess elastomer 550 from the interior of the mold/mold cap 510, 520. Following this seventh step 507, the mold/mold cap assembly 510, 520 may be relocated to a convenient location since the assembly is self-contained at this point. In an eighth step 508, following a sufficient cure time, the bladder 530 is deflated, the mold cap 520 is raised out of engagement with the mold 510, and the mold segments 511 are disengaged from each other and the newly cured tire 600. In a ninth step 509, the tire 600 is fully removed from engagement with the bladder 530 and is ready for use.

During the fifth, sixth, and seventh steps 505-507, the actual dimensions of the bladder 530, mold/mold cap 510, 520, and carcass ply will determine whether the carcass ply will be completely encased by the elastomer 550 (FIG. 25) or the inner surface of the carcass ply forms the inner toroidal surface of the tire 600. In other words, the fully inflated bladder 530 will either directly engage the inner surface of the carcass ply, expanded by the axial converging of the beads 541, 542, thereby forming a tire 600 having an inner toroidal surface which is the inner surface of the carcass ply; or the fully inflated bladder will not reach the inner surface of the carcass ply, thereby allowing the elastomer to flow into that gap and forming a completely encased carcass ply.

A tire 300, 600 for use with the system of the present invention may include an interwoven, or interlaced, plurality of helical springs (i.e., coiled wires which deform elastically under load with little energy loss). The tire 300, 600 may define a toroidal shaped structure for mounting to a wheel 200. The tire 300, 600 may contour to a surface on which the tire engages to facilitate traction while mitigating vibration transmission to a corresponding vehicle. The helical springs support and/or distribute a load of the vehicle. The tire 300, 600 may be pneumatic or non-pneumatic.

Under the weight of a vehicle, the tire 300, 600 may be driven, towed, or provide steering to the vehicle. The helical springs of the tire 300, 600 may passively contour to any terrain by flexing and moving with respect to each other. The interwoven structure of the helical springs provides stability to the tire 300, 600 and prevents the structure from collapsing as the tire rotates and engages variable terrain.

The helical springs of the tire 300, 600 may be resilient through a finite range of deformation, and thus a relatively rigid frame similar to a carcass ply may be used to prevent excessive deformation. Radially oriented portions of the springs may be used to connect the tire 300, 600 to the wheel 200. These springs may be interwoven, or interlaced. Other springs may be incorporated with the tire at any bias angle, from radial to circumferential, with the purpose of distributing load. These other springs may be helical springs. Further, as one example, these other springs may extend circumferentially around the tire at a radially outer portion of the tire 300, 600.

Figure 4:
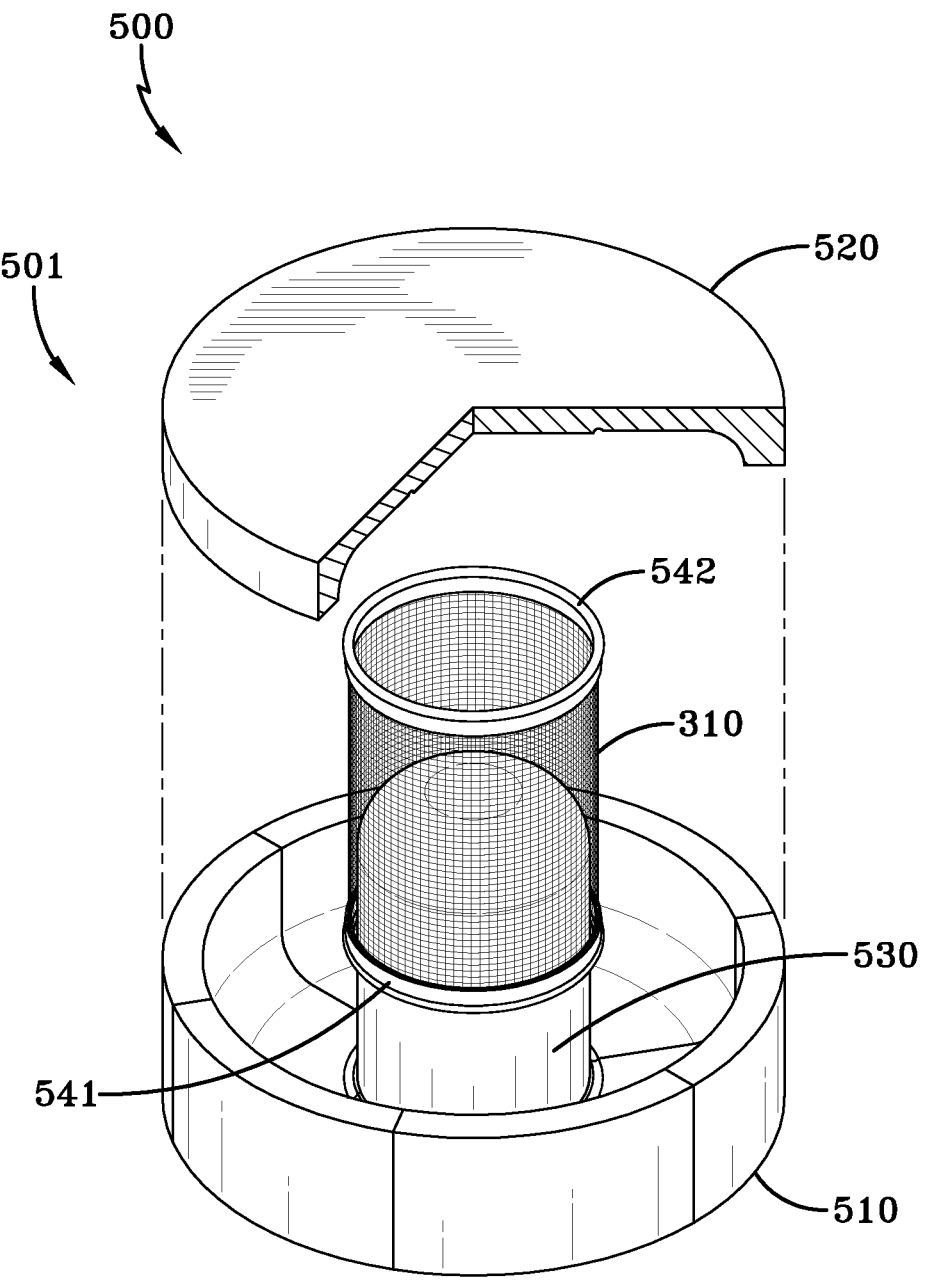
FIG. 4 schematically shows a second step of constructing a non-pneumatic tire in accordance with the system of the present invention.
Figure 5:
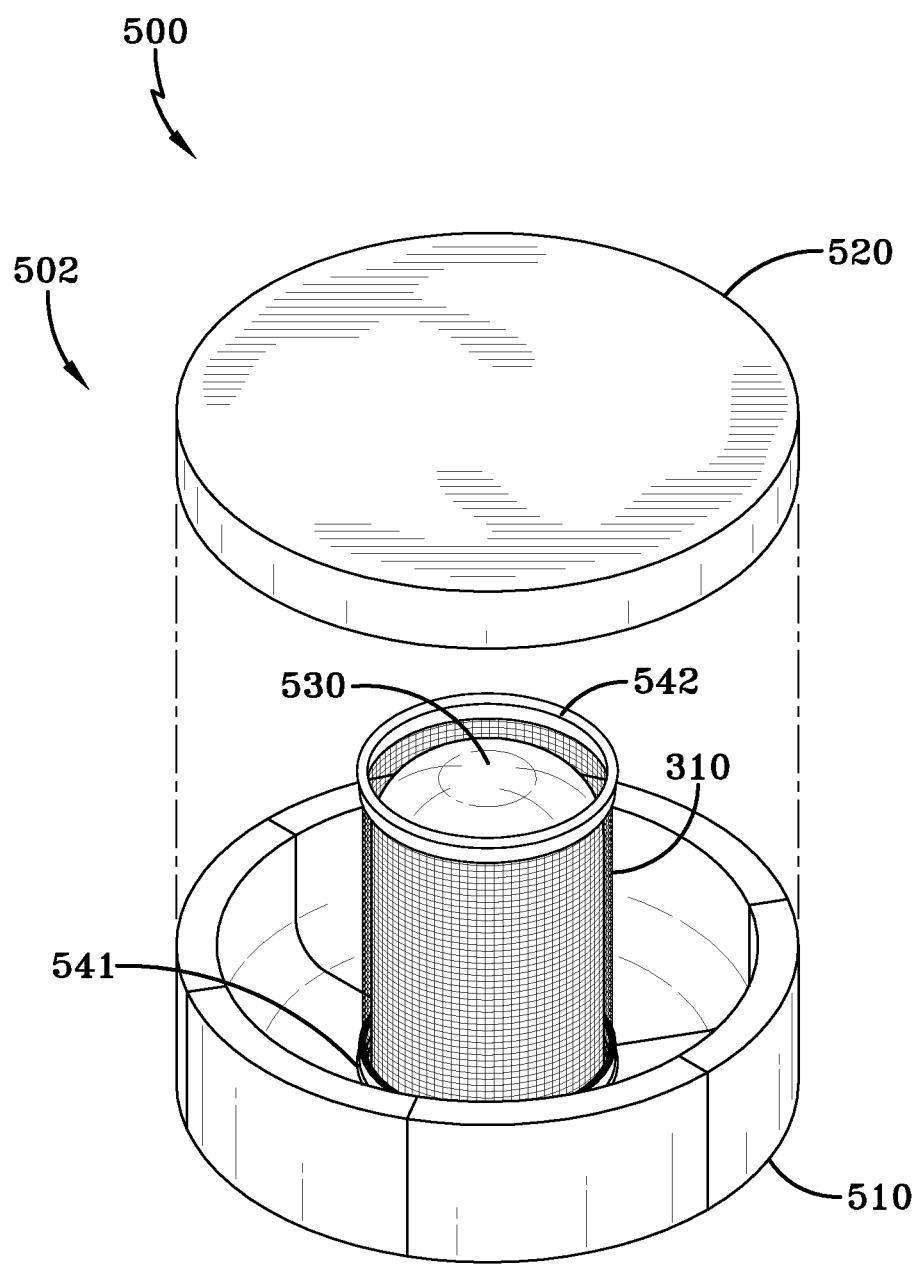
FIG. 5 schematically shows a third step of constructing a non-pneumatic tire in accordance with the system of the present invention.
Figure 6:
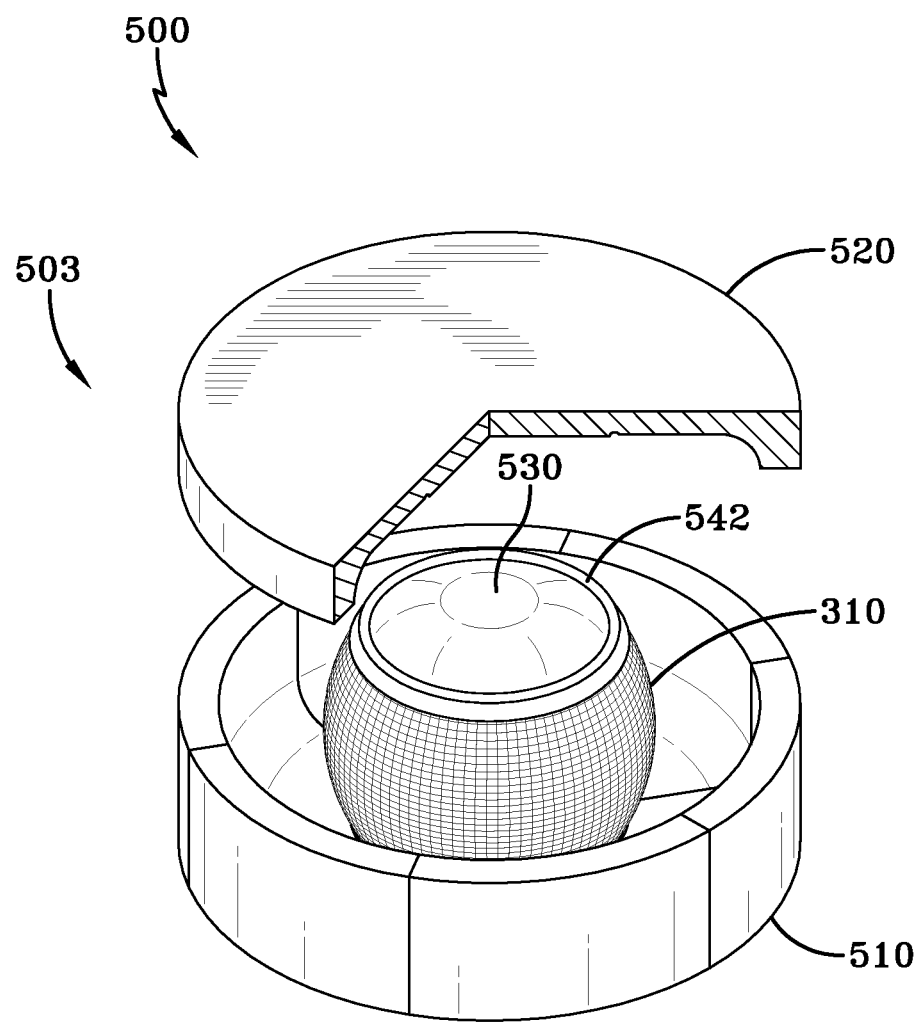
FIG. 6 schematically shows a fourth step of constructing a non-pneumatic tire in accordance with the system of the present invention.
Figure 9:
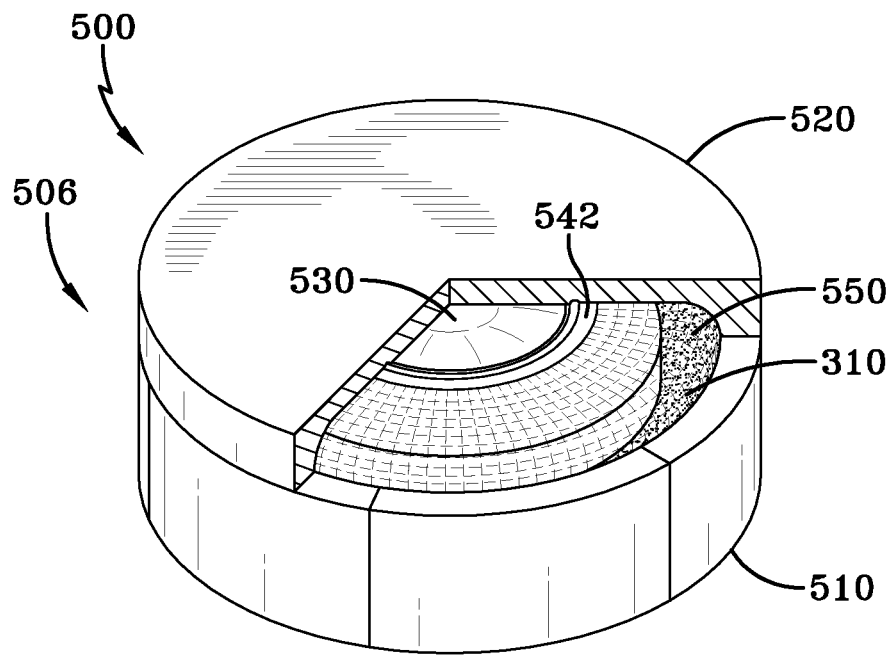
FIG. 9 schematically shows a seventh step of constructing a non-pneumatic tire in accordance with the system of the present invention.
Figure 10:
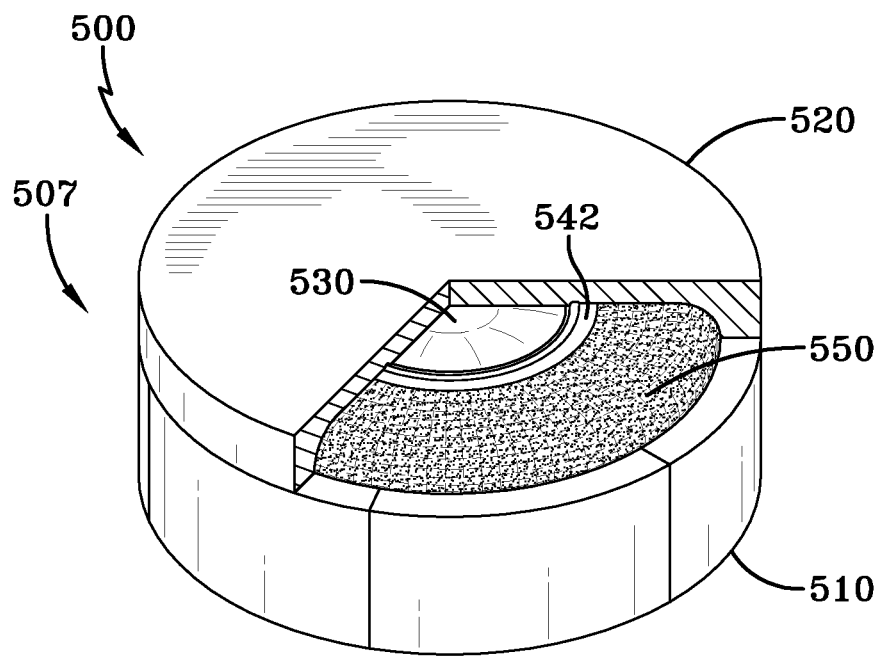
FIG. 10 schematically shows an eighth step of constructing a non-pneumatic tire in accordance with the system of the present invention.
Figure 11:
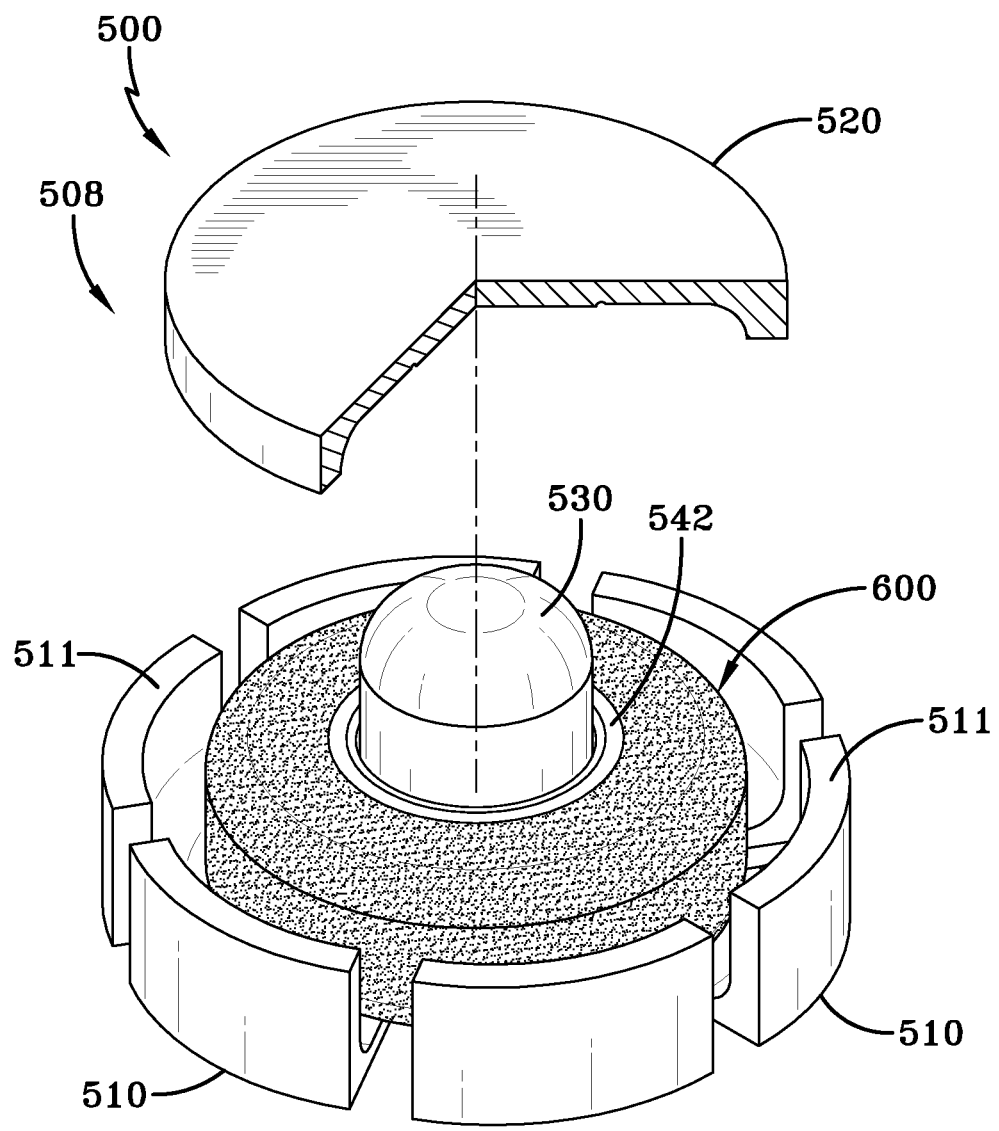
FIG. 11 schematically shows a ninth step of constructing a non-pneumatic tire in accordance with the system of the present invention.
Figure 12:
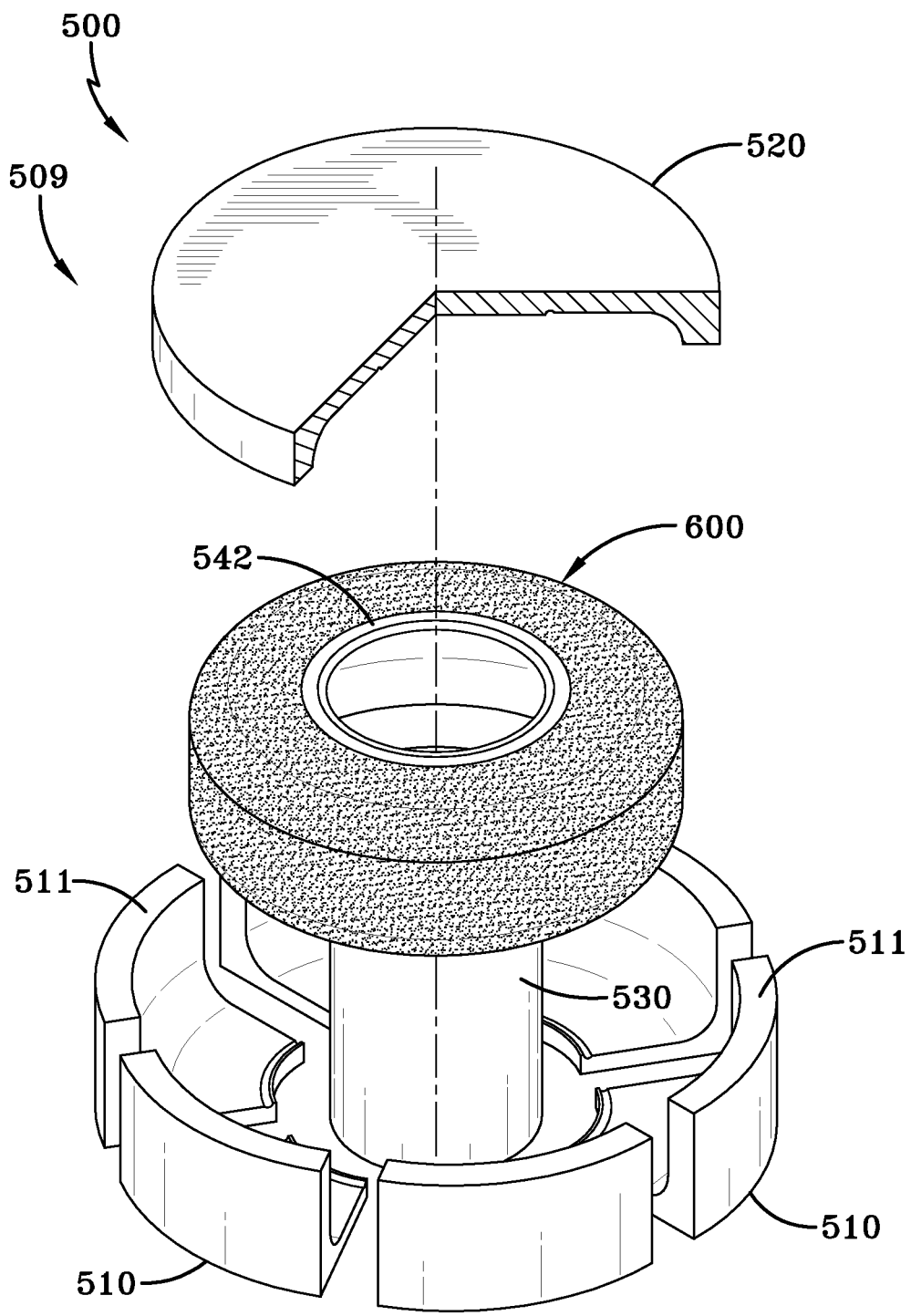
FIG. 12 schematically shows a tenth step of constructing a non-pneumatic tire in accordance with the system of the present invention.

External covering of some kind (i.e., a tread, an elastomer 550) may be added to partially or fully protect the helical springs from impact damage and/or to change the tire's ability to float and generate traction. As one example, four basic steps may be utilized to manufacture one example carcass ply structure for the tire 300, 600: i) twisting helical springs together to form a rectangular sheet with a length corresponding to the desired tire circumference; ii) interweaving ends of the rectangular sheet of springs to form a mesh cylinder (FIG. 4); iii) collapsing one end of the mesh cylinder and attaching it to a rim of a wheel 200; and iv) flipping the other end of the mesh cylinder inside out and attaching it to another axially opposite rim of the wheel 200.

A tire 300, 600 in accordance with the system of the present invention may be utilized on Earth, the Moon, Mars, and/or any other planetary body, since its elements operate reliably in atmospheric and terrain conditions of these planets. The tire 300, 600 may be utilized on its own, or incorporated as a partial or auxiliary load support/distribution system within another tire type. The tire 300, 600, however, requires no air, operates in difficult environments, and contours to all terrains.

The tire 300, 600 provides an improvement over the conventional wire mesh, non-pneumatic tire of the Apollo LRV. The tire 300, 600 provides higher load capacity, since wire size of the helical springs may be increased with relatively little functional alteration. The tire 300, 600 provides a longer cycle life, since wire stresses of the helical springs are more uniformly distributed throughout the carcass ply-like structure. Further, the tire 300, 600 provides relatively low weight per unit of vehicle weight supported, since the interwoven helical spring network (like a carcass ply) is fundamentally stronger than the crimped wire mesh. Additionally, helical springs are able to compress and elongate to accommodate manufacturing variations. Finally, the tire 300, 600 provides improved design versatility, since load distribution springs may be added to vary the tire strength in different tire locations and directions.

The tire 300, 600 may further provide relatively low energy loss compared to tires that use frictional or hysteretic materials in a carcass, since the helical springs consume near zero energy during deformation. The tire 300, 600 contains redundant load carrying elements and may operate normally even after significant damage. A tire 300, 600 in accordance with the system of the present invention may thus be utilized for low vehicle energy consumption, for tire failure posing a critical threat, for traveling through rough terrain, for exposure to extreme temperatures or high levels of radiation, and/or for exposure to gun fire or bomb blasts.

Figure 13:
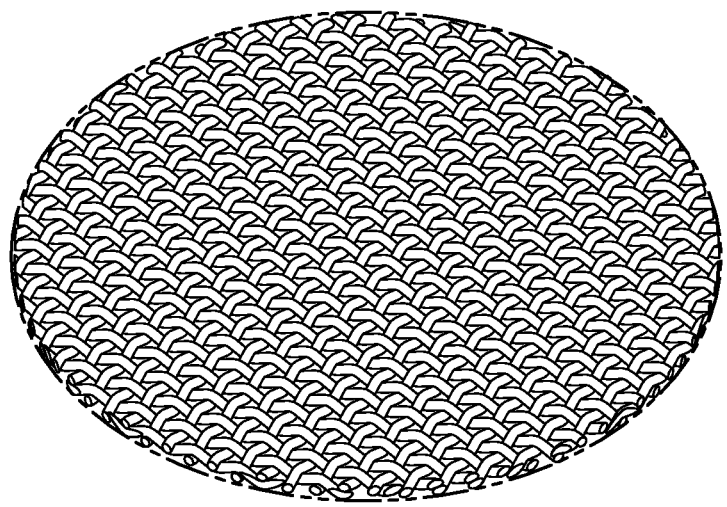
FIG. 13 represents a schematic illustration of a conventional wire mesh sheet.
Figure 14:
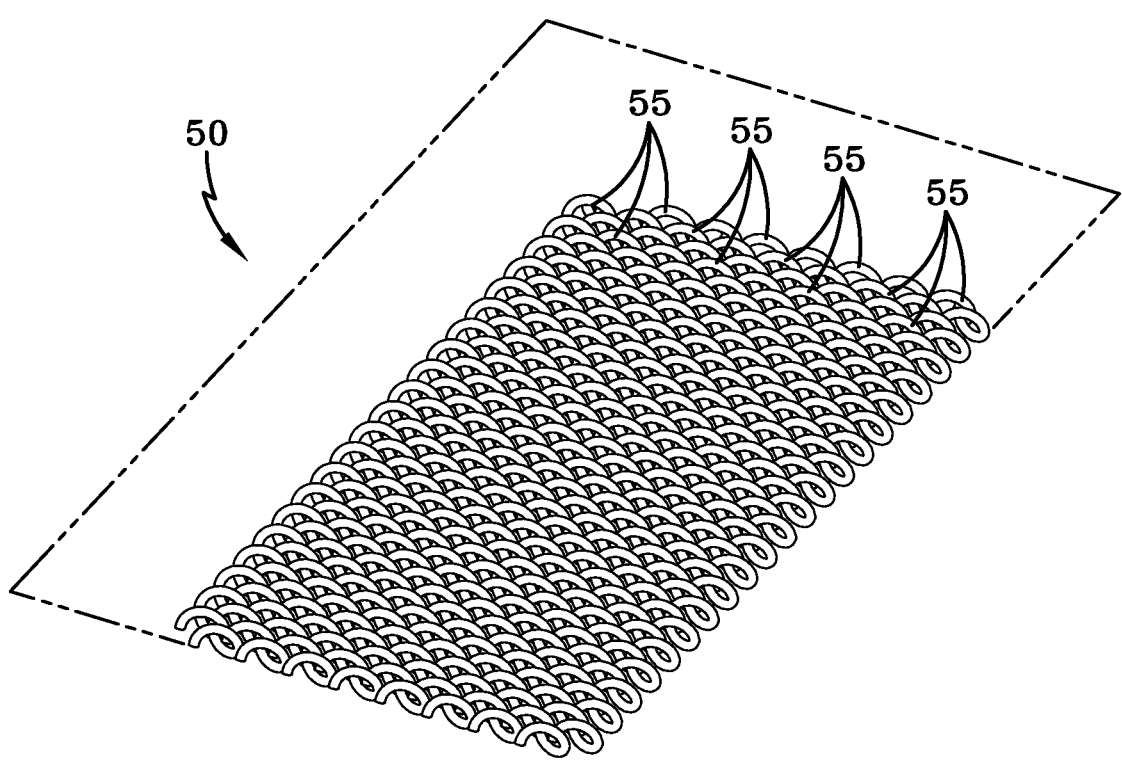
FIG. 14 represents a sheet of interwoven helical springs for use with the system of the present invention.
Figures 15, 16:
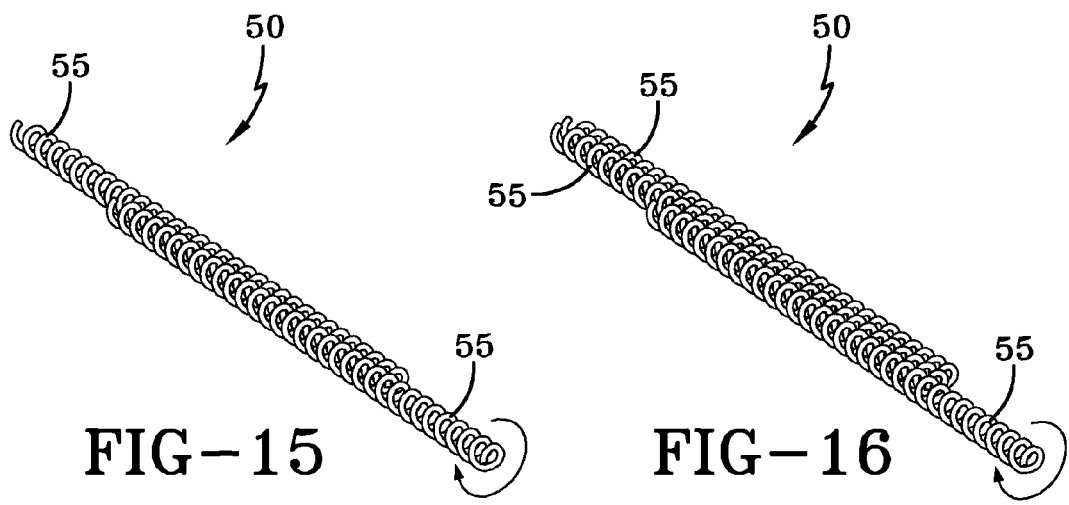
FIG. 15 represents an intermediate step in forming the sheet of FIG. 14.
FIG. 16 represents another intermediate step in forming the sheet of FIG. 14.
Figure 17:
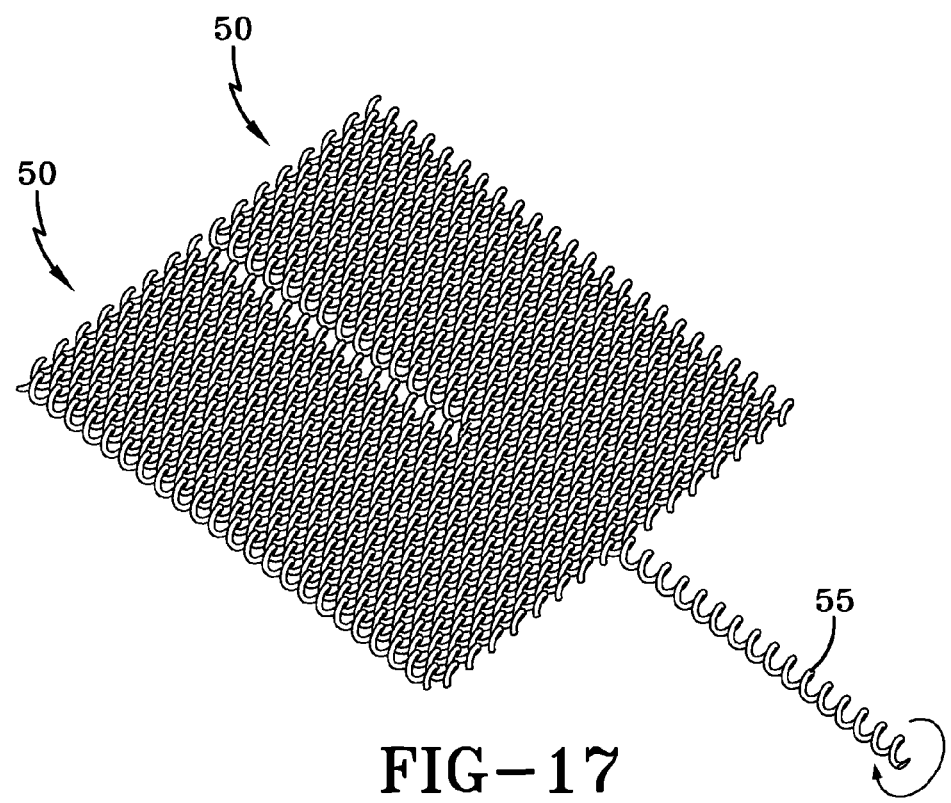
FIG. 17 represents a step in securing two sheets, such as the sheet of FIG. 14, together.
Figure 18:
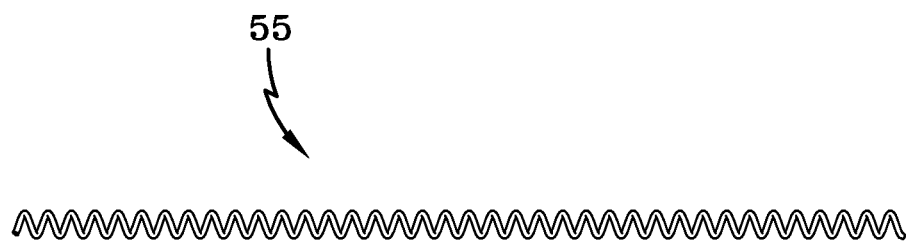
FIG. 18 represents an example helical spring for use with the system of the present invention.
Figure 19:
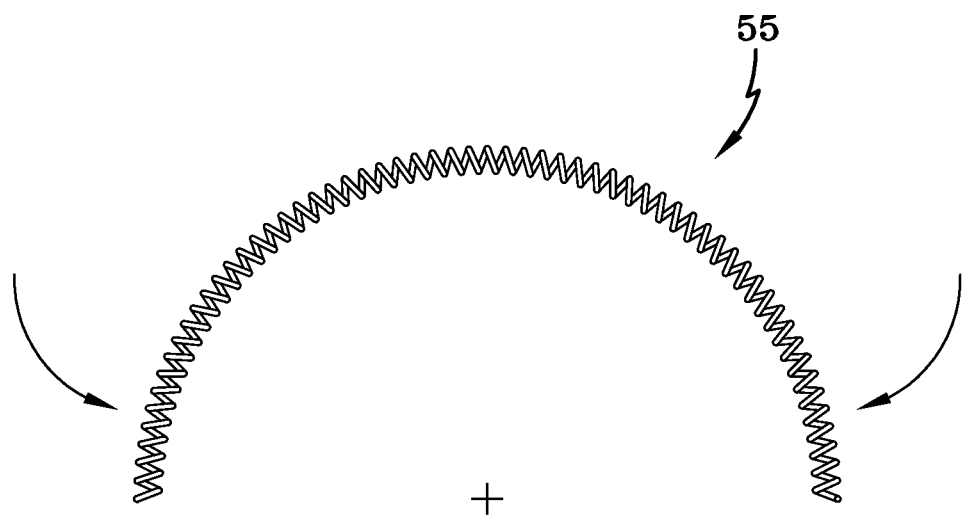
FIG. 19 represents the helical spring of FIG. 18 in a deflected condition.

As shown in FIG. 13, a woven wire mesh has been used for a conventional lunar tire. However, as discussed above, greater strength and durability is desired. FIG. 14 shows a mesh sheet 50 of interwoven helical springs 55 that may provide greater strength and durability than the wire mesh. FIGS. 15, 16, and 17 show intermediate steps in forming a mesh sheet 50 as shown in FIG. 14. In FIG. 15, a first helical spring 55 is shown being rotated thereby interweaving that same first spring with a second helical spring 55. In FIG. 16, a third helical spring 55 is shown being rotated thereby interweaving that third spring with the already woven first and second springs 55. In FIG. 17, a helical spring 55 is shown being rotated for connecting two mesh sheets 50 (i.e., the sheet of FIG. 14) of helical springs 55. FIG. 18 shows a single helical spring 55 for use as described above in FIGS. 14-17. FIG. 17 shows a single helical spring 55 deflected for use in a tire such as the tires 300, 600, as described below.

Figure 20:
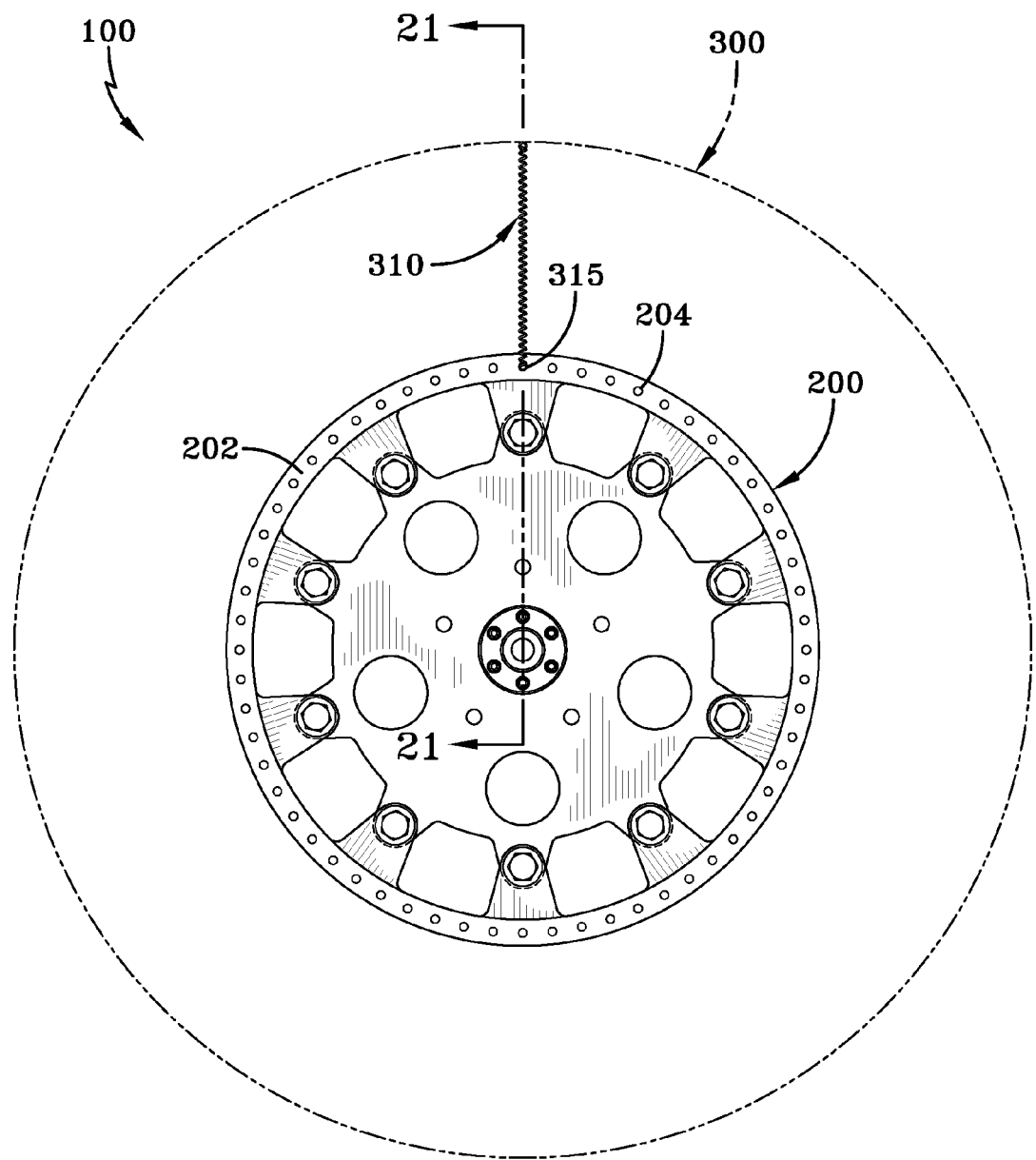
FIG. 20 represents a schematic illustration of an example tire and wheel assembly in accordance with the system of the present invention.
Figure 21:
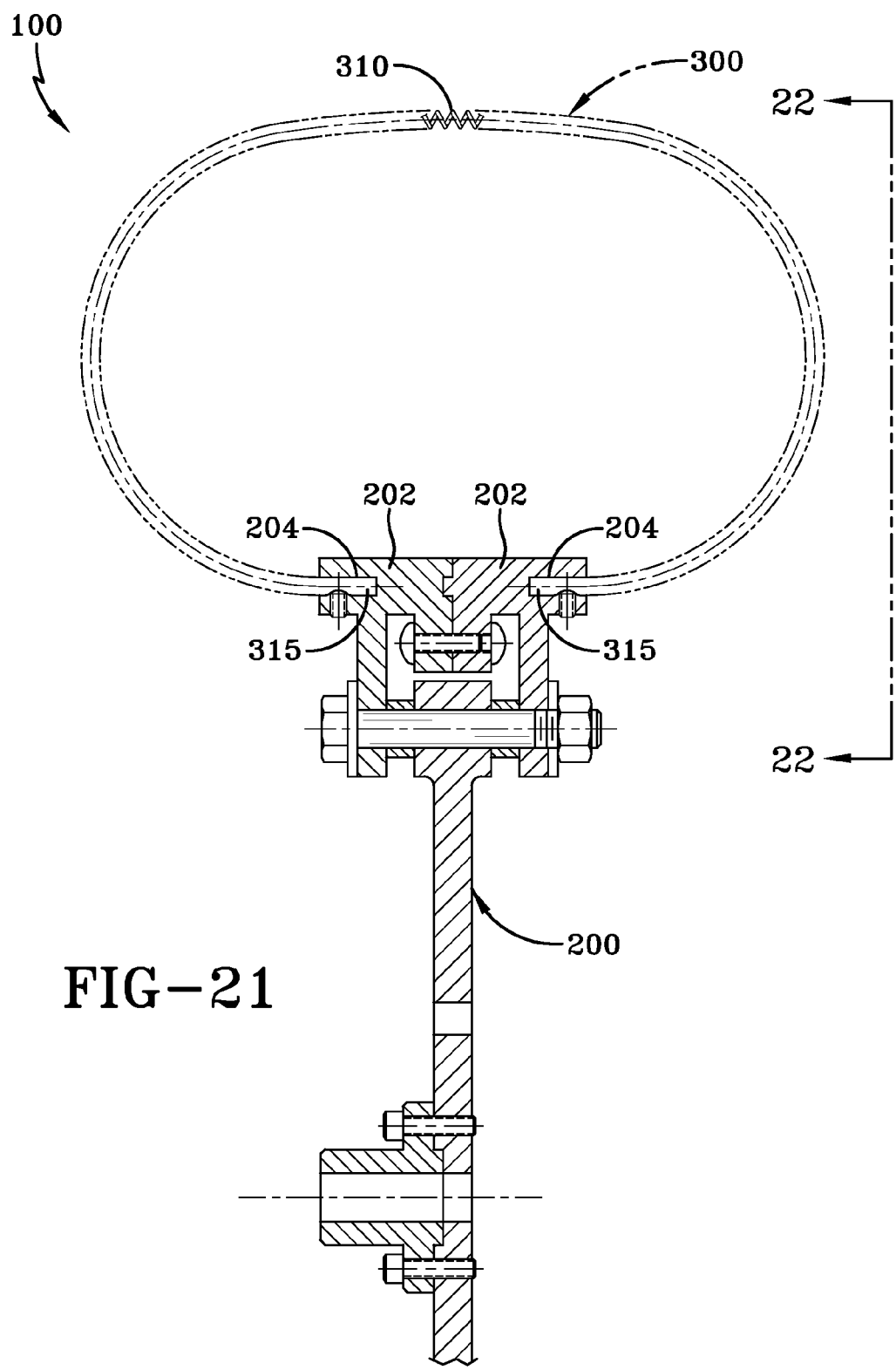
FIG. 21 represents a section taken through line 21-21 in FIG. 20.
Figure 22:
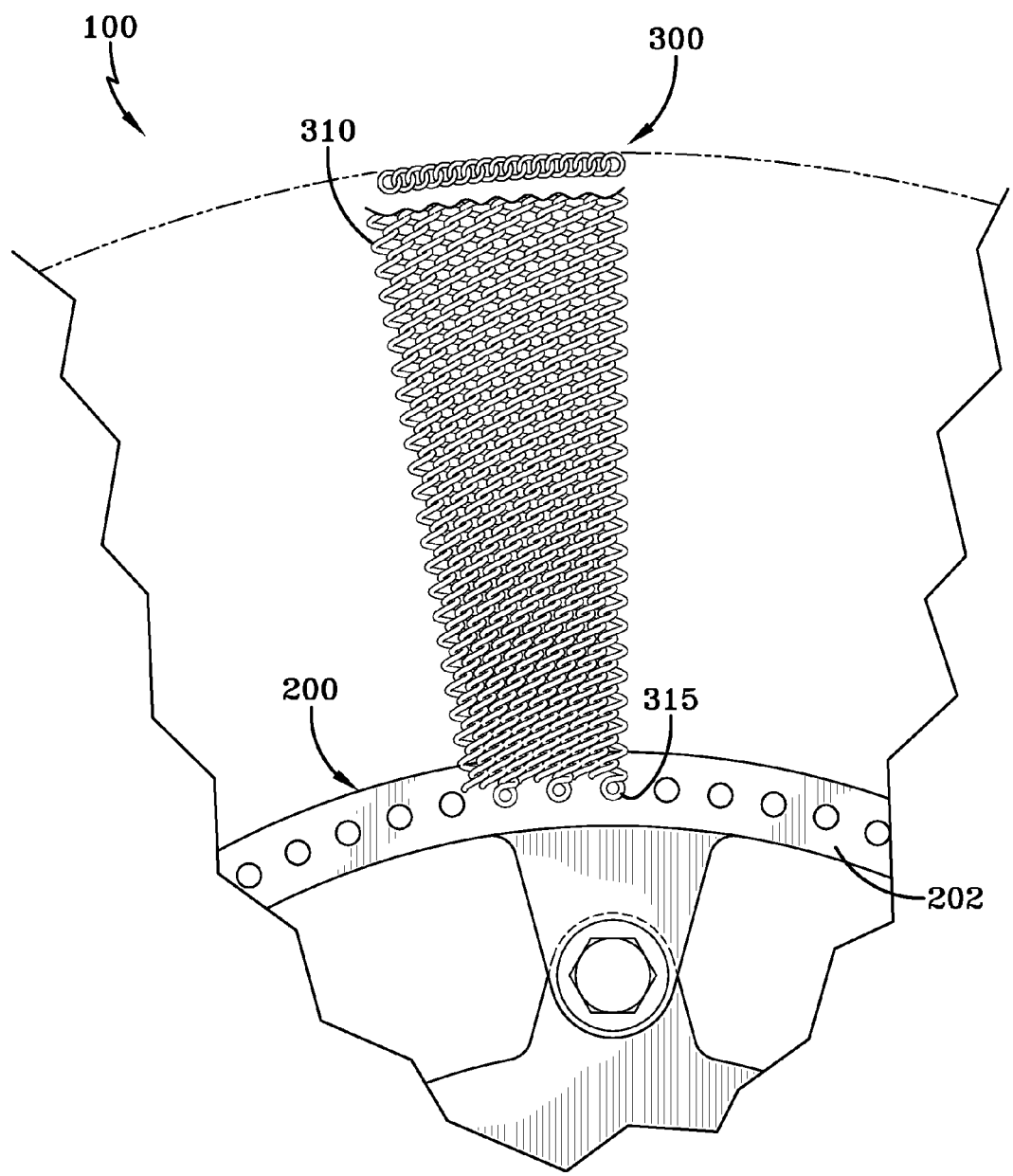
FIG. 22 represents a section taken through line 22-22 in FIG. 21.

As shown in FIGS. 20-22, an example assembly 100 for use with the present invention includes a wheel 200 and a tire 300. The wheel 200 has an annular rim 202 at each axial side for securing the tire 300 to the wheel. Each rim 202 is fixed relative to the other rim 202. Each rim 202 may include a plurality of socket holes 204 for aligning the tire 300 with the rim. Any other suitable means may be used for securing the tire 300 to the rim 200.

The tire 300 may include a plurality of helical springs 310 extending radially away from the wheel 200 in an arching configuration and radially back toward the wheel. Each end 315 of each spring 310 may be secured at a corresponding rim 202 of the wheel. Each spring 310 has a middle portion interconnecting the ends 315. Each end 315 may be secured at an axial orientation (FIG. 21) or at an angled orientation, with each spring 310 extending axially outward from one rim 202, then away from the wheel 300, then back over itself, then inward, and finally axially toward the other rim 202. Each end 315 of each spring may thereby be oriented coaxially (or at an angle) with the other end 315 of the same spring.

Further, each spring 55 may be interwoven with adjacent springs 55 (FIG. 14) enabling load sharing between springs. As shown in FIG. 14, each spring 55 is interwoven, or interlaced, with an adjacent spring 55 on a first side of the spring and further being interwoven with an adjacent spring 55 on a second opposite side of the spring. Thus, the springs 310 extend radially and axially and form a woven toroidal structure, similar to the carcass ply of a pneumatic tire, extending about an entire circumference of the tire 300 (FIGS. 20-22).

The helical springs 310 may be any suitable length, gauge, pitch, and shape (i.e., oval springs, elliptical springs, etc.). The helical springs 310 may vary in coil diameter (i.e., barrel springs may be used) to create continuity in the mesh through the range of radial positions in the tire 300 (i.e., narrower coil width at the beads). The helical springs 310 may be further structured as two or more plies, one or more radially inner plies being radially overlapped by one or more radially outer plies. Further, at least one helical spring of one ply may be interwoven with at least one helical spring of another ply for advantageously increasing strength of the overall structure. The helical springs 310 may be Ti—N alloy, steel, titanium, polymer, ceramic, or any other suitable material.

The purely metallic, non-pneumatic spring tire 300 described above has been developed for space applications. The structure is a series of interwoven springs as seen in FIG. 22. This structure was well suited to space applications where rubber is not permitted due to temperature variations (40K to 400K). In addition, the spring tire 300 may achieve excellent traction where soil composition may be soft sand such as the Moon.

On Earth, however, the variety of road surfaces causes the purely metallic contact interface of the above tire 300 to have limited application. Based on this limited commercial application, in accordance with the system of the present invention, the interwoven structure of the tire 300 may be enhanced for terrestrial applications.

In order to achieve traction on the wide variety of terrestrial road surfaces, a polymer may be added to the all-metal tire 300 to serve as a tread. For step 504 of the method 500, one option is to use a two-part polyurethane that may be poured into the mold 510 containing the pre-assembled spring tire 300. Once the two parts are mixed together, a chemical reaction occurs that cures the polymer at ambient temperature and pressure. Once the cure is complete, the resulting tire 300 is removed from the form and is ready for use.

Figure 23:
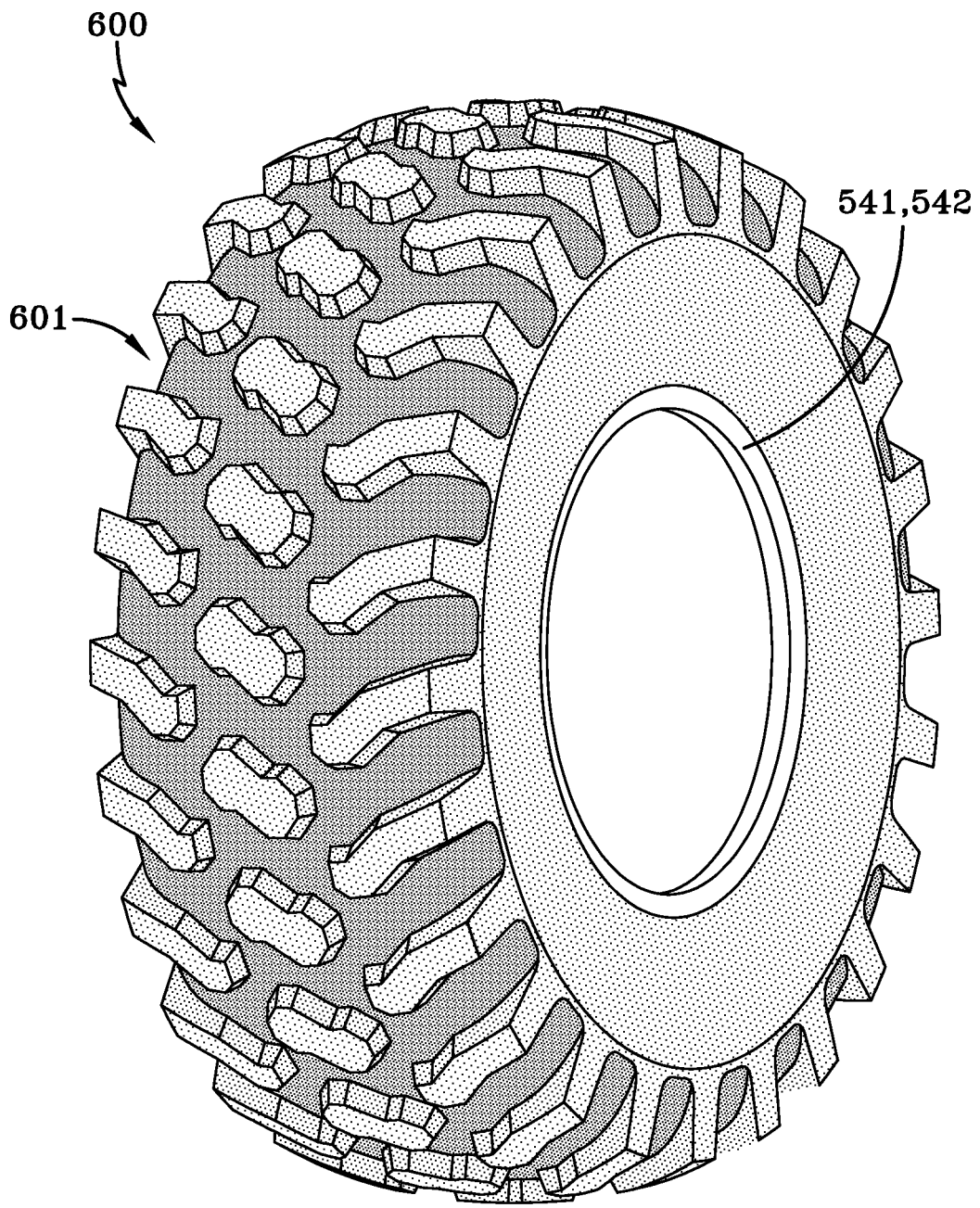
FIG. 23 represents a schematic perspective view of an example tire for use with the present invention.
Figure 24:
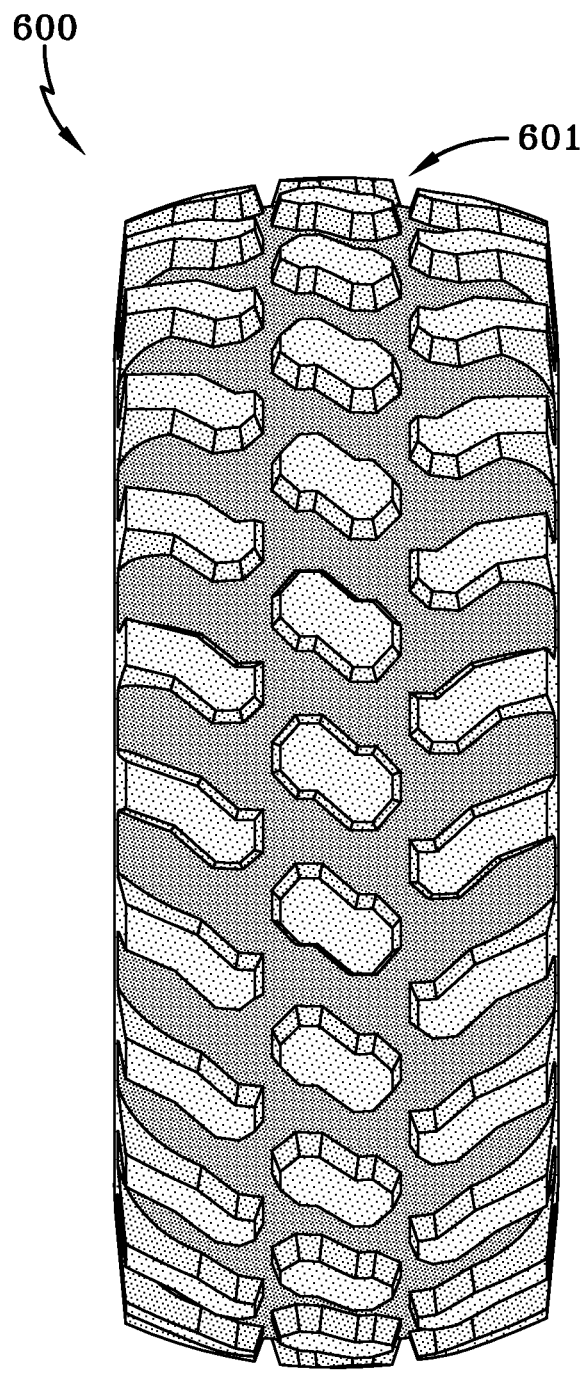
FIG. 24 represents a schematic orthogonal view of the tire of FIG. 23.
Figure 25:
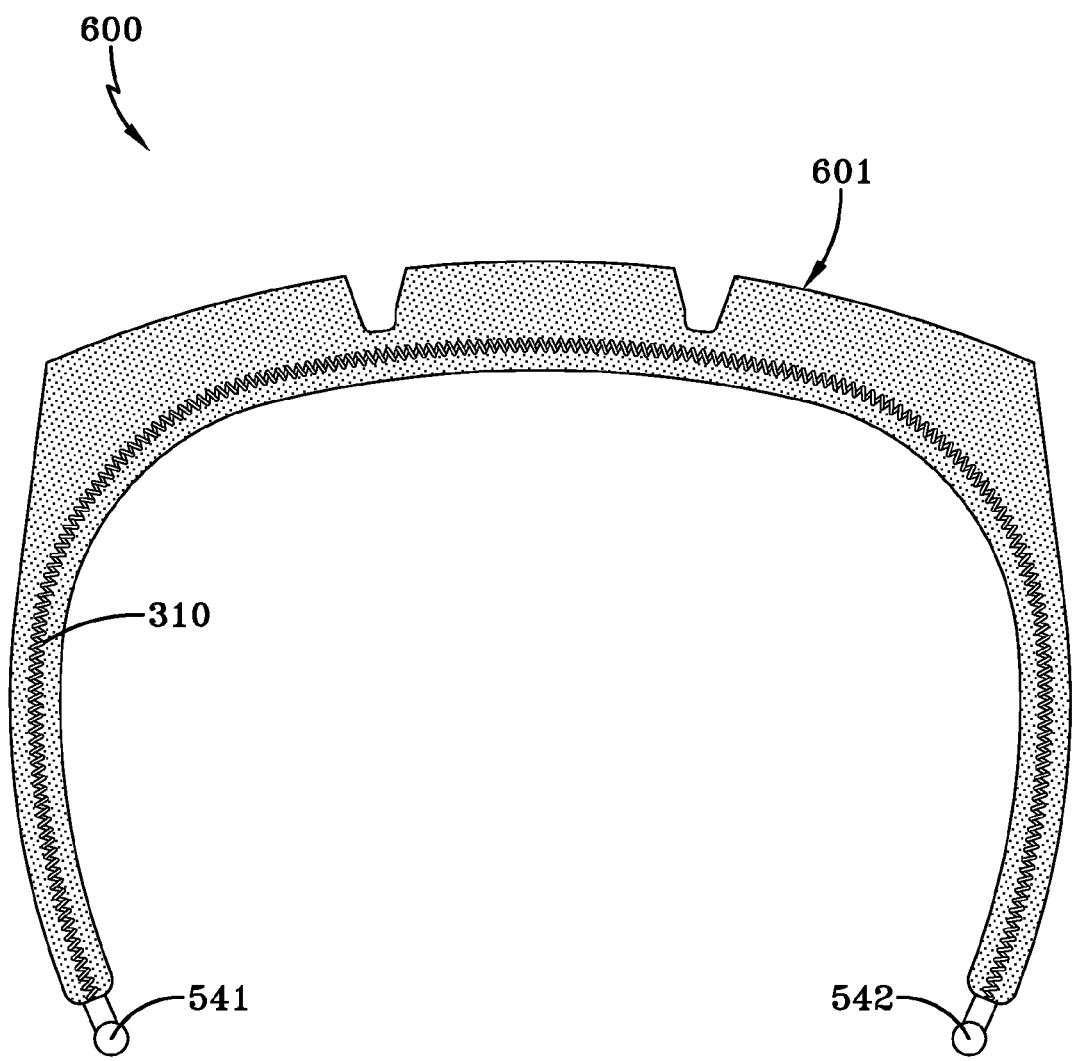
FIG. 25 represents a schematic cross-sectional view of the tire of FIG. 21.
Figure 26:
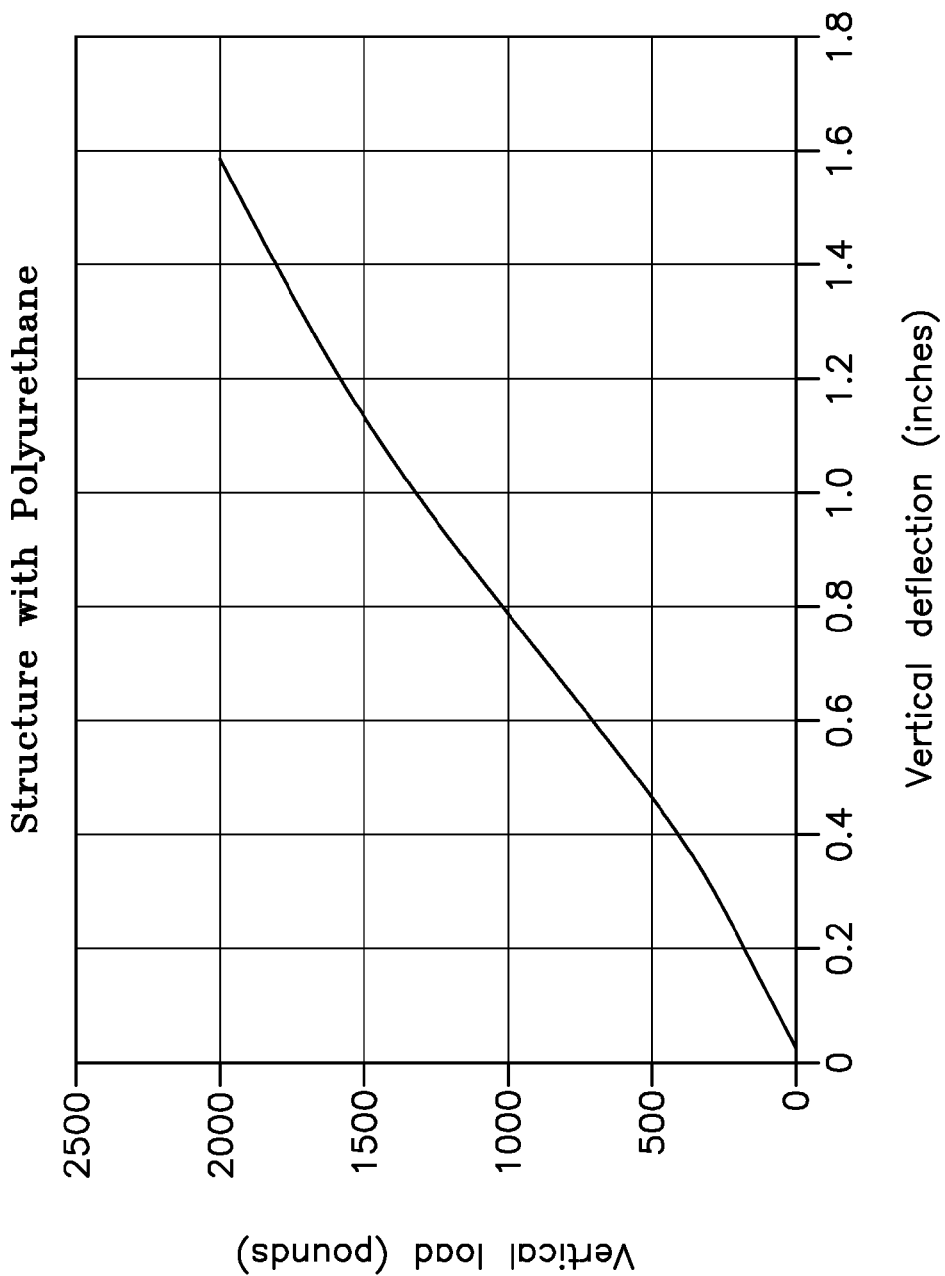
FIG. 26 represents a schematic of an example load/deflection curve.

In laboratory samples, fatigue was tested per the dimensions from Table 1 below with cycling of over one million cycles with a deflection of 1.5 inches. Based on prospective load requirements and terrain specifications, a polymer coated tire was targeted at an all-terrain vehicle (ATV). As shown in FIGS. 23-25, such a tire 600 was determined to have load/deflection characteristics indicated by the load/deflection curve of the non-pneumatic tire 600 shown in FIG. 26. The structural stiffness of the tire 600 was significantly higher than was expected from the spring structure itself. The polymer used, urethane, itself not only carries some load in bending, but also constrains the spring motion in such a way (e.g. prevention of rotation) as to increase the bending stiffness of the springs.

TABLE 1

| Spring dimensions for lab samples | |
| --- | --- |
| Outer Diameter (mm) | 6.985 |
| Inner Diameter (mm) | 4.318 |
| Wire Filament Diameter (mm) | 1.397 |
| Spring Pitch (mm) | 6.620 |

As shown in FIGS. 23-25, the rims 202 used for the lunar spring tire 300 may not be utilized with the method 500. A rim similar to those used for standard pneumatic tires may be used with the method 500 to produce the tire 600. By way of example only, three options are: 1) a custom rim designed specifically for the particular vehicle and service application; 2) a standard (commercially available) rim, for light duty applications; and 3) a standard (commercially available) rim modified to allow mechanical fasteners to fix the tire bead to the rim (since the beads 541, 542 need not have an air-tight engagement with the rim).

The polymer/spring tire 600 for use with the system of the present invention thus shares its load carrying mechanism with lunar spring tire 300 (i.e., the interwoven spring carcass-like structure). Additionally, the polymer encased interwoven spring ply becomes an anisotropic ply, with different properties along the axes and transverse to the spring axes. However, unlike typical fiber reinforced plies, the reinforcing springs 310 themselves have a bending stiffness, due to the width of the helixes of each spring, which may be greater than bending stiffness of the reinforcing filaments or yarns alone.

This additional bending stiffness contributes significantly to the overall bending stiffness of the interwoven spring ply. Since bending stiffness carries the load placed on the spring ply tire 300, 600, this is contrary to a conventional pneumatic tire, which carries load in tension away from the footprint in the cords (filaments or yarns) of the upper segment of the pneumatic tire. Other conventional non-pneumatic tires also carry loads by tension in members in an upper section of such tires. Thus, an interwoven spring tire for use with the system of the present invention is a flexible, bottom-loaded structure unlike conventional tires. As shown in FIGS. 23-25, the polymer coating of the interwoven spring ply may form a tread pattern 601 designed for traction with the spring ply structure carrying the majority of the load.

The example polymer 550 may comprise an elastomeric material which may have a Young's modulus E from about 21 Kg/cm$^2$ to about 21,000 Kg/cm$^2$. The tensile modulus at 300% may be 161 Kg/cm$^2$ or 915.9 MPa. As another alternative, a Young's modulus greater than 140 Kg/cm$^2$ may require a mixture of polyurethane and chopped fibers of an aromatic polyamide. Also, boron may be mixed with polyurethane.

Figure 2:
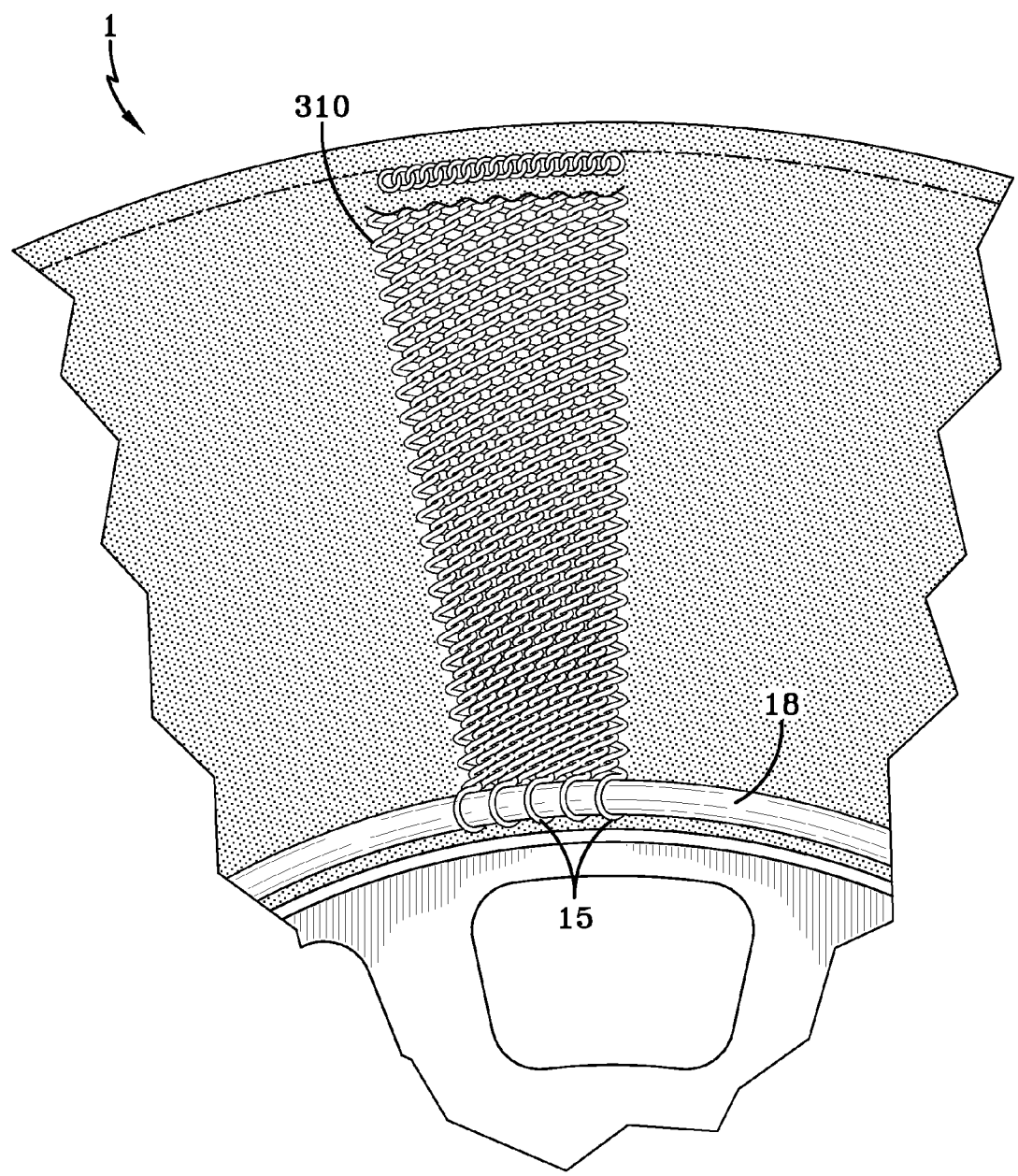
FIG. 2 represents a schematic cross-sectional view of the example tire of FIG. 1.
Figure 3:
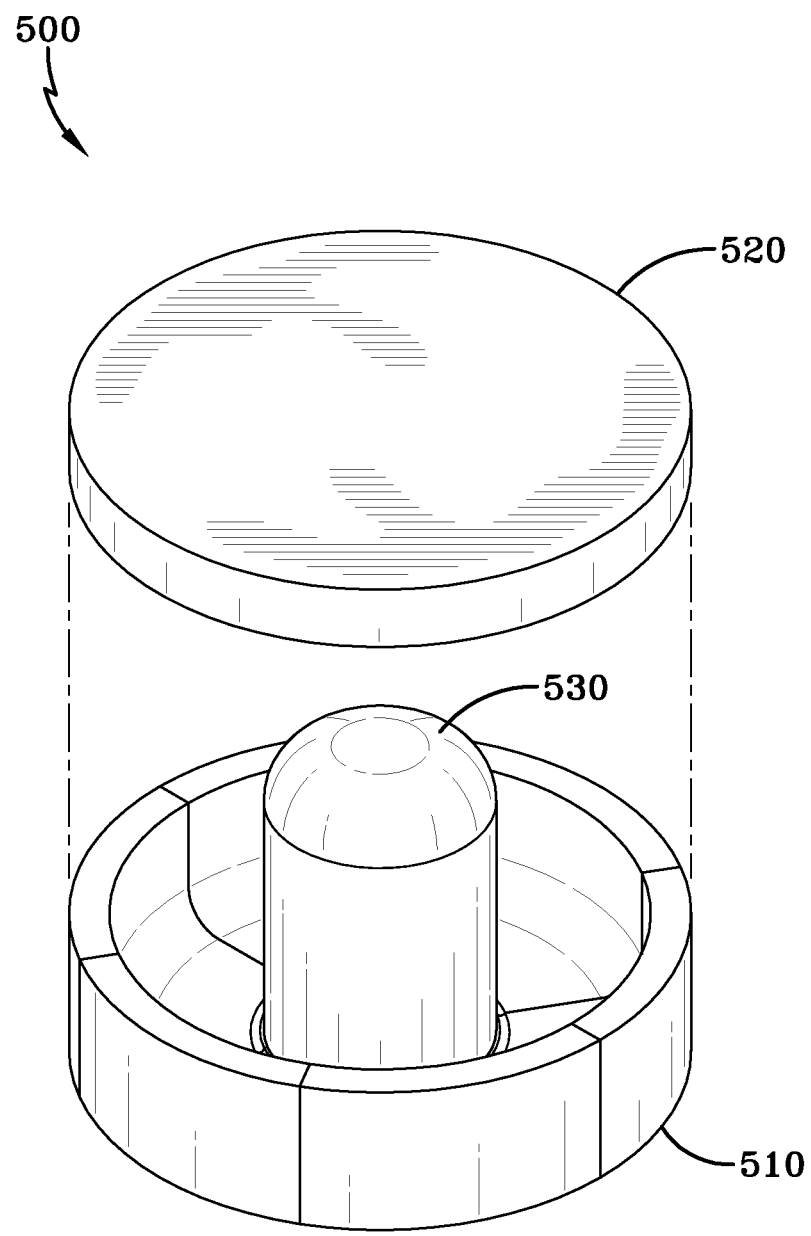
FIG. 3 schematically shows a first step of constructing a non-pneumatic tire in accordance with the system of the present invention.

A non-pneumatic tire, method, and/or system 1 in accordance with the present invention may include radially extending end portions of the interwoven springs 310 each being wrapped around, or circumscribing, a bead wire, a bundle of bead wires, or other bead structure 18 (FIGS. 1 & 2) and secured to a conventional rim 5, similar to the interface of bead structures and rims of conventional pneumatic tires. Thus, standard rims 5 may be utilized with such a non-pneumatic tire 1, 600.

End portions 20 of each spring 310 may be wrapped around first ands second bead structures 18. Further, adjacent end portions 20 of the springs 310 may alternatingly (FIG. 2 in the circumferential direction) be wrapped around the bead structure 18 (left bead portion 20 in FIG. 1) and just end adjacent the bead wire (right bead portion 20 in FIG. 1) with the polymer/elastomer encasing and/or securing the end portions of these "loose" springs. This alternating arrangement may also allow a second ply 300 (as discussed above) to be alternatingly wrapped around the bead structure where the loose ends are not attached. Such a bead portion 20 may provide improved bead retention pressure at the tire/rim interface. An apex (not shown) may also be added to the bead portion 20 for lateral tuning of the tire 1.

Non-pneumatic tires (e.g., tires 300, 600) may provide minimal holding force to a conventional rim. For high-speed or high-load applications, the bead area may lose contact with the rim and "de-bead" itself. A bead portion 20 in accordance with the present invention may increase the holding force of a non-pneumatic tire to a conventional rim thereby enhancing performance at high speeds and/or high loads.

As stated above, a carcass ply structure 300 of radial springs 310 for use with the system of the present invention, as well as the bead structure 20 in accordance with the present invention, produce excellent load bearing performance in the example non-pneumatic tire 1, 300, or 600. This carcass ply structure 300 thus enhances the performance of the example non-pneumatic tire 1, 300, or 600. Though non-pneumatic, the similarity of the carcass ply structure 300 to a traditional pneumatic tire carcass ply produces an instructive comparison.

The complexities of the structure and behavior of the pneumatic tire are such that no complete and satisfactory theory has been propounded. Temple, *Mechanics of Pneumatic Tires* (2005). While the fundamentals of classical composite theory are easily seen in pneumatic tire mechanics, the additional complexity introduced by the many structural components of pneumatic tires (and the example non-pneumatic tire 1, 300, 600) readily complicates the problem of predicting tire performance. Mayni, *Composite Effects on Tire Mechanics* (2005). Additionally, because of the non-linear time, frequency, and temperature behaviors of polymers and rubber (and elastomers), analytical design of pneumatic tires is one of the most challenging and underappreciated engineering challenges in today's industry. Mayni.

A pneumatic tire (and the example non-pneumatic tire 1, 300, 600) has certain essential structural elements. United States Department of Transportation, *Mechanics of Pneumatic Tires*. pages 207-208 (1981). An important structural element is the carcass ply, typically made up of many flexible, high modulus cords of natural textile, synthetic polymer, glass fiber, or fine hard drawn steel embedded in, and bonded to, a matrix of low modulus polymeric material, usually natural or synthetic rubber. Id. at 207 through 208. The example non-pneumatic tire 1, 300, 600 in accordance with the present invention has a carcass ply structure 300 of radial springs 310.

The flexible, high modulus cords are usually disposed as a single layer. Id. at 208. Tire manufacturers throughout the industry cannot agree or predict the effect of different twists of carcass ply cords on noise characteristics, handling, durability, comfort, etc. in pneumatic tires, *Mechanics of Pneumatic Tires*. pages 80 through 85. A prediction of the effect of interweaving helical springs on noise characteristics, handling, durability, comfort, etc. is even less likely.

These complexities are demonstrated by the below table of the interrelationships between tire performance and tire components.

| | LINER | CARCASS PLY | APEX | BELT | OV'LY | TREAD | MOLD |
|---|---|---|---|---|---|---|---|
| TREADWEAR | | | | X | | X | X |
| NOISE | | X | X | X | X | X | X |
| HANDLING | | X | X | X | X | X | X |
| TRACTION | | | | | | X | X |
| DURABILITY | X | X | X | X | X | X | X |
| ROLL RESIST | X | | X | X | | X | X |
| RIDE COMFORT | X | X | X | | | X | |
| HIGH SPEED | | X | X | X | X | X | X |
| AIR RETENTION | X | | | | | | |
| MASS | X | X | X | X | X | X | X |

As seen in the table, carcass ply cord characteristics affect the other components of a pneumatic tire (i.e., carcass ply affects apex, belt, overlay, etc.), leading to a number of components interrelating and interacting in such a way as to affect a group of functional properties (noise, handling, durability, comfort, high speed, and mass), resulting in a completely unpredictable and complex composite. Thus, changing even one component can lead to directly improving or degrading as many as the above ten functional characteristics, as well as altering the interaction between that one component and as many as six other structural components. Each of those six interactions may thereby indirectly improve or degrade those ten functional characteristics. Whether each of these functional characteristics is improved, degraded, or unaffected in the example non-pneumatic tire 1, 300, 600, and by what amount, certainly would have been unpredictable without the experimentation and testing conducted by the inventors.

Thus, for example, when the structure (i.e., spring stiffness, spring diameter, spring material, etc.) of the carcass ply structure 300 of the example non-pneumatic tire 1, 300, 600 is modified with the intent to improve one functional property of the non-pneumatic tire, any number of other functional properties may be unacceptably degraded. Furthermore, the interaction between the carcass ply structure 300 and the cured elastomer 550 may also unacceptably affect the functional properties of the non-pneumatic tire. A modification of the carcass ply structure 300 may not even improve that one functional property because of these complex interrelationships.

Thus, as stated above, the complexity of the interrelationships of the multiple components makes the actual result of modification of a carcass ply structure of a non-pneumatic tire, in accordance with the system of the present invention, impossible to predict or foresee from the infinite possible results. Only through extensive experimentation have the carcass ply structure 300 and elastomer 550 of the system of the present invention been revealed as an excellent, unexpected, and unpredictable option for a non-pneumatic tire.

In the foregoing description, certain terms have been used for brevity, clearness, and understanding; but no unnecessary limitations are to be implied therefrom beyond the requirement of the prior art, because such terms are used for descriptive purposes and are intended to be broadly construed. Moreover, the description and illustration of the present invention is by way of example, and the scope of the present invention is not limited to the exact details shown or described.

Having now described the features, discoveries, and principles of the present invention, the manner in which the present invention is constructed and used, the characteristics of the construction, and the advantageous, new, and useful results obtained, the scope of the new and useful structures, devices, elements, arrangements, parts, and combinations are hereby set forth in the appended claims.

What is claimed:

1. A non-pneumatic tire comprising a plurality of springs, each spring comprising a first end portion, a second end portion, and an arching middle portion, each spring being interwoven with at least one other spring thereby forming a toroidal structure extending about an entire circumference of the non-pneumatic tire, the toroidal structure being at least partially coated with an elastomer,
   one end portion of at least one spring being wrapped around a first bead structure adjacent to a rim,
   other springs being incorporated with the non-pneumatic tire at a bias angle, from radial to circumferential, for the purpose of distributing load.

2. The non-pneumatic tire as set forth in claim 1 wherein one end portion of each spring is wrapped around the first bead structure or a second bead structure and the other end of each spring is not wrapped around either bead structure.

3. The non-pneumatic tire as set forth in claim 1 wherein both end portions of each interwoven spring are wrapped around the first bead structure and a second bead structure.

4. The non-pneumatic tire as set forth in claim 1 wherein the end portion of at least one spring wrapped around the first bead structure is encased by the elastomer.

5. The non-pneumatic tire as set forth in claim 1 wherein each end portion of each spring is encased by the elastomer.

6. The non-pneumatic tire as set forth in claim 1 wherein the other end portion of the at least one spring is not wrapped around a second bead structure.

7. The non-pneumatic tire as set forth in claim 6 wherein the other end portion is disposed adjacent the second bead structure.

8. The non-pneumatic tire as set forth in claim 1 wherein the other end portion is secured by the elastomer.

9. The non-pneumatic tire as set forth in claim 1 wherein the rim is a standard rim.

10. The non-pneumatic tire as set forth in claim 1 wherein both end portions of each spring are secured to the first bead structure and a second bead structure.

11. A system for constructing a non-pneumatic tire comprising a plurality of helical springs, each helical spring comprising a first end portion secured to a first bead portion, a second end portion secured to a second bead portion, and an arching middle portion, each helical spring being interwoven with at least one other helical spring thereby forming a toroidal carcass ply structure extending about an entire circumference of the non-pneumatic tire, the toroidal carcass ply structure being at least partially coated with an elastomer cured to adhere to the toroidal carcass ply structure,
   coil diameters of the helical springs varying for creating continuity in the toroidal carcass ply structure throughout a range of radial positions in the non-pneumatic tire.

12. The system as set forth in claim 11 wherein the elastomer comprises a two-part polyurethane for chemically curing the elastomer onto the toroidal carcass ply structure at ambient temperature.

13. The system as set forth in claim 12 wherein the cured elastomer forms a tread portion for generating traction of the non-pneumatic tire over varied contact surfaces.

14. The system as set forth in claim 12 wherein toroidal carcass ply structure forms an anisotropic structure having different mechanical properties in the circumferential direction of the non-pneumatic tire and the radial direction of the non-pneumatic tire.

15. The system as set forth in claim 12 further including a segmented mold for curing the elastomer to the toroidal carcass ply structure.

16. The system as set forth in claim 11 wherein each spring is interwoven with an adjacent spring on a first side of the spring and further is interwoven with an adjacent spring on a second opposite side of the spring thereby forming a toroidal carcass ply structure extending about an entire circumference of the non-pneumatic tire.

17. The system as set forth in claim 11 wherein the elastomer is urethane.

18. A pneumatic tire comprising a plurality of springs, each spring comprising a first end portion, a second end portion, and an arching middle portion, each spring being interwoven with at least one other spring thereby forming a toroidal structure extending about an entire circumference of the non-pneumatic tire, the toroidal structure being at least partially coated with an elastomer,
   one end portion of at least one spring being wrapped around a first bead structure adjacent to a rim,
   the springs being constructed of a ceramic material.

19. The pneumatic tire as set forth in claim 18 wherein the end portion of at least one spring wrapped around the first bead structure is encased by the elastomer.

20. The pneumatic tire as set forth in claim 19 wherein the other end portion of the at least one spring is not wrapped around a second bead structure, but is encased by the elastomer.

* * * * *